(12) United States Patent
Wan et al.

(10) Patent No.: US 12,309,281 B1
(45) Date of Patent: May 20, 2025

(54) SYSTEMS AND METHODS FOR PROTECTING CELLULAR NETWORK MESSAGES

(71) Applicant: CABLE TELEVISION LABORATORIES, INC., Louisville, CO (US)

(72) Inventors: Tao Wan, Ottawa (CA); Bernard McKibben, Golden, CO (US); Mark J. Poletti, Louisville, CO (US); Ruoyu Sun, Westminister, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 477 days.

(21) Appl. No.: 17/240,530

(22) Filed: Apr. 26, 2021

Related U.S. Application Data

(63) Continuation-in-part of application No. 17/220,446, filed on Apr. 1, 2021, now Pat. No. 11,882,449, which is a continuation-in-part of application No. 17/102,169, filed on Nov. 23, 2020, now Pat. No. 12,137,176.

(60) Provisional application No. 63/135,461, filed on Jan. 8, 2021, provisional application No. 63/108,014, filed on Oct. 30, 2020, provisional application No.
(Continued)

(51) Int. Cl.
*H04L 29/06* (2006.01)
*H04L 9/30* (2006.01)
*H04L 9/32* (2006.01)
*H04W 12/106* (2021.01)

(52) U.S. Cl.
CPC .............. *H04L 9/3247* (2013.01); *H04L 9/30* (2013.01); *H04L 9/3297* (2013.01); *H04W 12/106* (2021.01)

(58) Field of Classification Search
None
See application file for complete search history.

(56) References Cited

U.S. PATENT DOCUMENTS 8,606,324 B2 * 12/2013 Murasawa .............. H04W 8/26
455/560
10,200,861 B2    2/2019 Nair et al.
(Continued)

FOREIGN PATENT DOCUMENTS

WO    WO-2010120837 A1 *  10/2010   ........ H04W 36/0061
WO       2018076798 A1      5/2018

*Primary Examiner* — Jeffery L Williams
(74) *Attorney, Agent, or Firm* — Armstrong Teasdale LLP

(57) ABSTRACT

A client-side electronic device includes a receiver, a processor, and a memory. The receiver communicates with a message server over a communication medium of a communication network. The memory stores computer-executable instructions, which, when executed by the processor, cause the device to receive, from the message server, a broadcast message, a timestamp associated with the broadcast message, and a first digital signature of the broadcast message and a second digital signature of the timestamp. The executed instruction further cause the device to verify an integrity of the broadcast message based the first or second digital signatures, determine a freshness of the broadcast message based on the received timestamp, calculate a trust state of the broadcast message based on the integrity verification and the freshness determination, and store the broadcast message in the memory along with the calculated trust state.

20 Claims, 11 Drawing Sheets

Related U.S. Application Data

63/015,314, filed on Apr. 24, 2020, provisional application No. 63/014,890, filed on Apr. 24, 2020, provisional application No. 63/003,373, filed on Apr. 1, 2020, provisional application No. 62/938,870, filed on Nov. 21, 2019.

(56) References Cited

U.S. PATENT DOCUMENTS

| | | | |
|---|---|---|---|
| 11,284,255 B1* | 3/2022 | Akkaya | H04L 9/3268 |
| 11,432,148 B2 | 8/2022 | Liu et al. | |
| 2011/0070897 A1* | 3/2011 | Tang | H04W 24/02 |
| | | | 455/466 |
| 2013/0326224 A1* | 12/2013 | Yavuz | H04L 9/3247 |
| | | | 713/176 |
| 2016/0212632 A1* | 7/2016 | Katamreddy | H04W 8/005 |
| 2018/0124602 A1 | 5/2018 | Nair et al. | |
| 2018/0124696 A1 | 5/2018 | Nair et al. | |
| 2018/0124697 A1 | 5/2018 | Nair et al. | |
| 2019/0288860 A1* | 9/2019 | Poltorak | H04L 63/04 |
| 2019/0349765 A1 | 11/2019 | Kolekar et al. | |
| 2020/0059372 A1* | 2/2020 | Goeringer | H04L 9/3268 |
| 2020/0267542 A1* | 8/2020 | Pronk | H04W 12/037 |
| 2021/0018953 A1* | 1/2021 | Ford | G06F 1/10 |
| 2021/0111902 A1 | 4/2021 | Lee et al. | |
| 2021/0204129 A1 | 7/2021 | Yang et al. | |
| 2021/0258301 A1* | 8/2021 | Benjamin | H04L 63/0823 |
| 2022/0272539 A1* | 8/2022 | Da Silva | H04W 12/122 |
| 2022/0407721 A1* | 12/2022 | Queralt | H04L 63/0815 |
| 2023/0224059 A1 | 7/2023 | Parkvall et al. | |

* cited by examiner

SYSTEMS AND METHODS FOR PROTECTING CELLULAR NETWORK MESSAGES

CROSS REFERENCE TO RELATED APPLICATIONS

This application is a continuation in part of U.S. patent application Ser. No. 17/220,446, filed Apr. 1, 2021, which is a continuation in part of U.S. patent application Ser. No. 17/102,169, filed Nov. 23, 2020. U.S. patent application Ser. No. 17/102,169 claims the benefit of and priority to U.S. Provisional Patent Application No. 62/938,870, filed Nov. 21, 2019. U.S. patent application Ser. No. 17/220,446 claims the benefit of and priority to U.S. Provisional Patent Application No. 63/135,461, filed Jan. 8, 2021. The present application also claims the benefit of and priority to U.S. Provisional Patent Application No. 63/015,314, filed Apr. 24, 2020, U.S. Provisional Patent Application No. 63/108,014, filed Oct. 30. 2020, U.S. Provisional Patent Application No. 63/014,890, filed Apr. 24, 2020, and U.S. Provisional Patent Application No. 63/003,373, filed Apr. 1, 2020. The entire contents and disclosures of all of these prior applications are incorporated by reference herein in their entireties.

BACKGROUND

The field of the disclosure relates generally to network messaging communications, and more particularly, to systems and methods for protecting broadcast messages from tampering and replaying attacks.

In conventional communication networks, and in particularly in the case of mobile networks, broadcasting messages have not been well protected. The lack of protection for broadcast messages has rendered broadcast messaging subject to significant spoofing and tampering. In the case of mobile subscribers, this lack of protection has been the root cause of many known attacks against the subscriber communications. Accordingly, there is a considerable desire in this field to fundamentally prevent such attacks. More specifically, there is a need to protect both broadcast messages and mobile broadcasting messages with respect to such security properties as message integrity, message uniqueness, and message freshness.

In two-party communications, message integrity may be protected by either symmetric-key based message authentication codes (MACs), or using asymmetric-key based digital signatures. For ease of explanation, the following description refers to a MAC as a type of digital signature, and to a message protected with either a MAC or another digital signature as being digitally signed. Key-based MAC solutions, however, remain a significant challenge for multiple-party communications, such as broadcasting messages over a network having a dynamic group membership, due to the fact that a symmetric key must be shared among all group members.

Additionally, replay attacks are another significant challenge to integrity protected broadcast messaging. In some conventional networks, for example a legitimate server (e.g., a base station) may broadcast a digitally-signed message, but a false "man-in-the-middle" base station may also receive the digitally-signed message and then re-broadcast it. A receiving client-side device (e.g., a user equipment (UE), in this example) will not be able to tell the difference between legitimate original digitally-signed message and the falsely replayed instance of the same message. Accordingly, there is a further desire in the field to more reliably guarantee the uniqueness and timeliness of broadcast messages to better prevent such replay attacks. Conventional solutions have focused on the inclusion of time-variant parameters, such as timestamps, with the original broadcast messages. However, this timestamp usage presumes synchronization between respective client-side and server-side clocks, which is not always the case. Furthermore, conventional solutions do not address scenarios where clocks on client-side and/or server-side may have been compromised. Thus, there is an additional need to protect the timestamp of a message in the presence of adversary, in addition to the message itself, with integrity.

A client-side electronic device is provided for receiving broadcast messages from a communication network. The client-side electronic device includes a receiver configured for operable communication with a plurality of message servers over a communication medium of the communication network. The client-side electronic device also includes a processor including a memory configured to store computer-executable instructions. The computer-executable instructions, when executed by the processor, cause the device to receive a plurality of broadcast messages from the plurality of message servers. The plurality of broadcast messages include a digital signature and timestamp. For each of the plurality of broadcast messages, the computer-executable instructions, when executed by the processor, also cause the device to determine if a corresponding digital signature is valid and if a timestamp is fresh. For each of the plurality of broadcast messages, the computer-executable instructions, when executed by the processor, further cause the device to compare the determinations of each of the corresponding broadcast messages. In addition, the computer-executable instructions, when executed by the processor, cause the device to select which message server of the plurality of message servers to connect to based on the comparison of the plurality of determinations.

SUMMARY

In an embodiment, a client-side electronic device is provided for receiving broadcast messages from a communication network. The device includes a receiver, a processor, and a memory. The receiver is configured for operable communication with, and receiving messages from, a first message server over a communication medium of the communication network. The memory is configured to store computer-executable instructions, which, when executed by the processor, cause the device to receive, from the first message server, a first broadcast message, a first timestamp associated with the first broadcast message, and a first digital signature of the first broadcast message and a second digital signature of the first timestamp. The executed instruction further cause the device to verify an integrity of the first broadcast message based on at least one of the first and second digital signatures, determine a freshness of the first broadcast message based on the received first timestamp, calculate a trust state of the first broadcast message based on the integrity verification and the freshness determination, and store the first broadcast message in the memory along with the calculated trust state.

In an embodiment, a central signing server is provided for a broadcast messaging system. The central signing server is in operable communication with a first message server of a plurality of message servers in the broadcast messaging system. The central signing server is configured to receive a digital signing request from the first message server. The digital signing request includes a broadcast message to be sent to a client in communication with the first message server. The central signing server is further configured to obtain a timestamp corresponding to the broadcast message, compute a digital signature over the received broadcast message and the obtained timestamp, and transmit a digital signing response to the first message server. The digital signing response includes the obtained timestamp and the computed digital signature.

In another embodiment, a client-side electronic device is provided for receiving broadcast messages from a communication network. The client-side electronic device includes a receiver configured for operable communication with a plurality of message servers over a communication medium of the communication network. The client-side electronic device also includes a processor including a memory configured to store computer-executable instructions. The computer-executable instructions, when executed by the processor, cause the device to receive a broadcast message from a first message server of the plurality of message servers. The broadcast message includes a digital signature and a timestamp. The computer-executable instructions, when executed by the processor, also cause the device to determine if the digital signature is valid, determine if the timestamp is fresh, and determine whether or not to connect to the first message server based on whether the digital signature is valid and the timestamp is fresh.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

Figure 1:
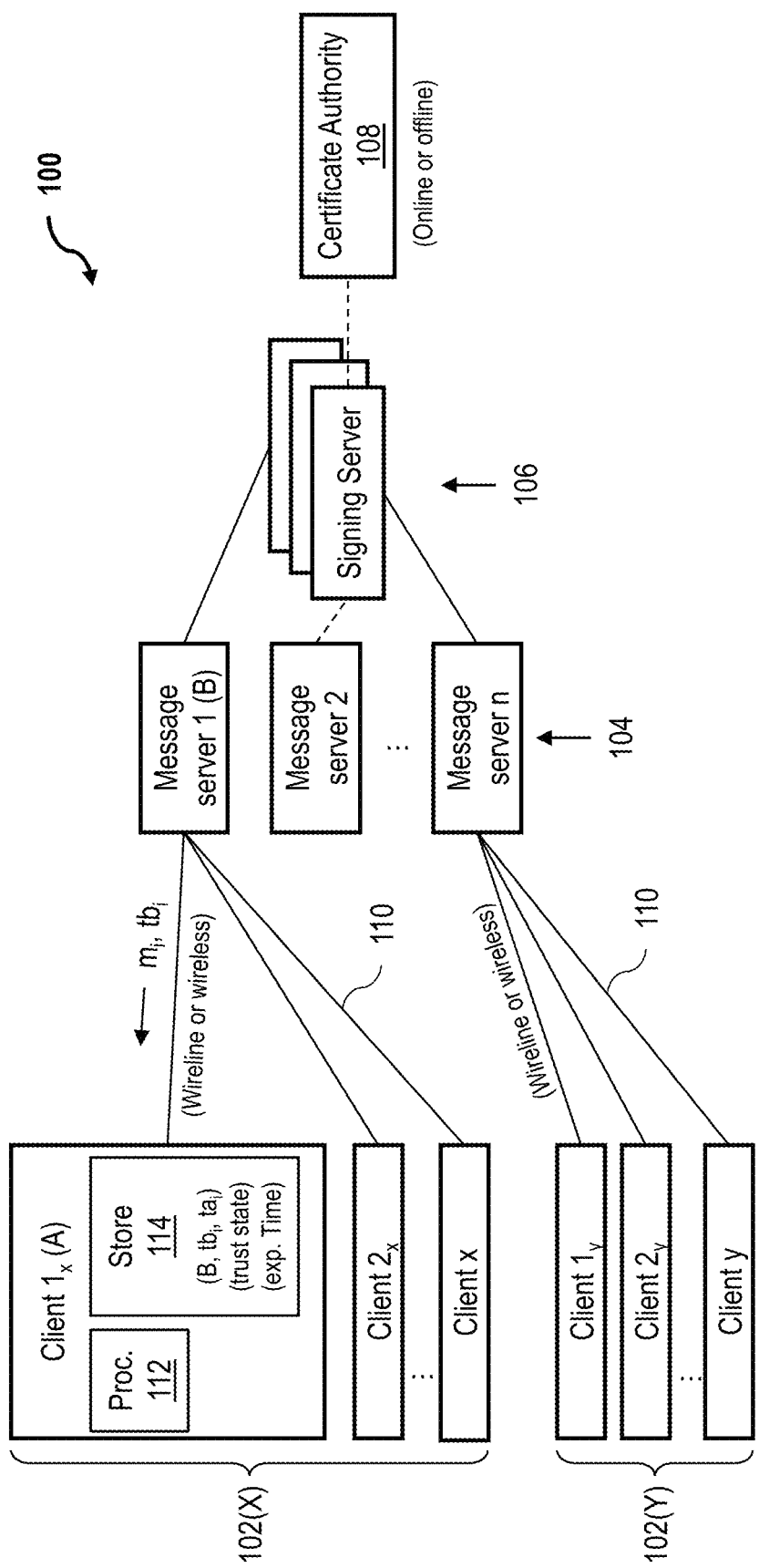
FIG. 1 is a schematic illustration of a communication system, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory.

Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, unless specified to the contrary, "modem termination system," or "MTS'" may refer to one or more of a cable modem termination system (CMTS), an optical network terminal (ONT), an optical line terminal (OLT), a network termination unit, a satellite termination unit, and/or other termination devices and systems. Similarly, "modem" may refer to one or more of a cable modem (CM), an optical network unit (ONU), a digital subscriber line (DSL) unit/modem, a satellite modem, etc.

As used further herein, "CA" may refer to a certificate authority hosting a root certificate, and may further include, without limitation, one or more of a CA computer system, a CA server, a CA webpage, and a CA web service.

As used herein, a Public Key Infrastructure (PKI) uses a pair of cryptographic keys (e.g., one public and one private) to encrypt and decrypt data. PKI utilization enables, for example, devices to obtain and renew X.509 certificates, which are used to establish trust between devices and encrypt communications using such protocols as Transport Layer Security (TLS), etc. A PKI includes policies and procedures for encrypting public keys, as well as the creation, management, distribution, usage, storage, and revocation of digital certificates. The PKI binds the public keys to the identity of a person or legal entity, typically through a trusted Certificate Authority (CA). The PKI hierarchy identifies a chain of trust for a device or program, and further may provide secure software download requirements for the devices, and/or secure certificate injection requirements on the device manufacturers. The CA, the electronic devices, the device manufacturers, and users of the device interact over a PKI ecosystem.

As used herein, a "message authentication code" (MAC) may refer to a type of digital signature, and a message that is protected with either a MAC or another type of digital signature is referred to herein as being "digitally signed."

The embodiments herein provide innovative systems and methods for establishing reliable message integrity, message uniqueness, message freshness, and/or key management at the server-side of a communication network, while enabling secure verification thereof at the client-side of the communication network.

The embodiments described herein further provide unique techniques for verifying timestamps of broadcast messages irrespective of a synchronization state between the client-side and the server-side. An exemplary communication network system architecture is described further below with respect to FIG. 1.

FIG. 1 is a schematic illustration of a communication system 100. In an exemplary embodiment, system 100 includes a plurality of clients 102, one or more message servers 104, and at least one signing server 106 in communication with a CA 108. Each of clients 102 may, for example, constitute an individual electronic computing device, such as a UE (e.g., where system 100 includes a mobile network), a Wi-Fi-enabled transceiver (e.g., where system 100 includes a Wi-Fi network), a modem or a cable modem (e.g., where system 100 includes a wireline, fiber, cable, or hybrid network), a router or residential gateway (e.g., where system 100 includes a local area network (LAN) or a home network), or a client group of 1-x, 1-y such client devices. Similarly, message server 104 may be at least one of a base station and a mobile core (e.g., in a mobile network), a eNB or a gNB (e.g., a 5G mobile network), a Wi-Fi access point (AP) (e.g., Wi-Fi network), and an MTS/CMTS (e.g., a wireline network). System may also include, for example, a converged cable access platform (CCAP) architecture for cable or fiber communication according to a data over cable service interface specification (DOCSIS) protocol.

In the exemplary embodiment, clients 102 are in operable communication with respective message servers over one or more communication media 110. Communication media 110 may include, for example, a wireline connection (e.g., fiber, cable, etc.), a licensed or unlicensed wireless communication channel (e.g., Wi-Fi, LAA, LTE, LTE-U, etc.), or a Citizens Broadband Radio Service (CBRS). Accordingly, clients 102 are configured for transceiver capability with the respective communication medium 110, and include at least one processor 112 and one or more memory storage devices 114 configured to store computer-executable instructions for processor 112, as well as broadcast messages M and/or timestamps received from message server 104, and certificates and/or keys from CA 108.

In some embodiments, a particular client 102 may further include, but is not limited to, a desktop computer, a laptop computer, a personal digital assistant (PDA), a cellular phone, a smartphone, a tablet, a phablet, or other web-based connectable equipment, such as an Internet of Things (IoT) device. For example, a UE client 102 may be a smartphone, and the network of system 100 may include a cellular network, such as, but not limited to, a 3GPP network, a 4G network, a 5G network, a 6G network, a MuLTEfire network, or another type of network over which the phone would attempt to communicate. For IoT devices, the network may be a private network or a specific network for that individual device, or for devices of similar types. For example, the network may be a network for IP cameras produced by a specific company, or IP cameras set-up at a specific location.

In the exemplary embodiment, protection of the message integrity of the messages broadcast from message server 104 to client 102 implements cryptographic techniques supporting key management, such as public key-based digital signatures and/or PKI. For ease of explanation, the following embodiments are described with respect to system 100 as a mobile network, client 102 as a UE, and message server as a base station (e.g., eNB, gNB, etc.) respectively.

In an exemplary embodiment, PKI-based digital signatures are utilized to protect broadcast messages by enabling messages broadcast from one party (e.g., message server 104) to be validated by many parties (e.g., clients 102) without having to share the signing key. The broadcasting messages M may themselves include a plurality of different message blocks, such as a Master Information Block (MIB) and System Information Blocks (SIBs). Accordingly, and as described further below with respect to FIGS. 2-4, message server 104 may protect broadcast messages M by employing digital signatures from signing server 106 to: (1) protect all message blocks of a message M together using a single digital signature; (2) protect a selected subset of message blocks together within a message M using a digital signature for just that subset; and (3) protect only selected fields within each message block with using a single digital signature for just those selected fields.

Using such cryptographic digital signatures, the individual clients 102 are enabled to verify the integrity of a received broadcast message M. Upon success or failure of the integrity verification at client 102, client 102 may perform one or more of the following actions: (i) upon a successful verification, client 102 may store the received broadcast message M in memory storage device 114 for future use; and (ii) upon a failed verification of a present broadcast message $M_i$, client 102 may utilize a prior broadcast message $M_{i-1}$ that has been previously successfully verified and stored in memory storage device 114. This successful prior broadcast message $M_{i-1}$ may then be used to provide to client 102 the communication services necessary to avoid the complete loss of services to client 102.

Known time-variant parameters include random numbers, sequence numbers, and timestamps. Random numbers are conventionally used in real-time interactive protocols, such as a challenge-response authentication protocol, when both parties involved in a two-way communication are online. However, in the case of non-interactive communication, each party would need to store the random numbers associated with all prior messages in order to verify the uniqueness of a newly received random number. This conventional technique thus requires one party to receive all messages from another party in order to verify the message uniqueness.

However, it should be noted that the use of random numbers alone does not guarantee the timeliness of non-interactive messages. Since, in mobile networks, UEs 102 often move from the range of one cellular station 104 to another, the respective UEs 102 may be in different states, and therefore, even though within operational range of the station 104, the UEs 102 may be unable to hear or listen to broadcasting channel 110, and thus may not receive all broadcasting messages M from the cell/station 104. Because the intrinsic properties of random numbers require all messages to be received from the other party, use of random numbers in mobile broadcasting communication is not suitable to guarantee the uniqueness of a received message M.

According to the present embodiments though, this problem is overcome through the implementation of sequence numbers in the broadcast messages instead of random numbers. Sequence numbers, similar to random numbers, are each themselves unique. Sequence number techniques differ, however, from random number techniques, in that sequence numbers are each incremented within a predetermined sequence. Therefore, receipt of a single sequence number is sufficient to enable the detection of a reply including any prior number in the sequence, thereby avoiding the need for the client to have to store all numbers in the sequence. That is, even if some broadcast messages are not heard by a UE 102 on channel 110, the UE may nevertheless be able to determine the message uniqueness by comparing the sequence number in the new message with a stored sequence number from a prior message.

In an exemplary embodiment, message server 104 may be configured to include a different sequence number in each broadcasting message M, in addition to other integrity protection techniques. In at least one embodiment, message server 104 includes a sequence number as part of the input to compute the digital signature of the message M. Alternatively, the sequence number may be included by signing server 106. In the exemplary embodiment, the sequence numbers are natural positive integers (e.g., beginning at values of 0, 1, or higher) and then incremented by consistent integer values of 1 or more with each succeeding message M, or portions thereof. Alternatively, the sequence number may be determined according to a number of time units between two time markers of a time counter (e.g., server clock).

According to these exemplary techniques, implementation of sequence numbering for the messages M broadcast within system 100 is particularly advantageous with respect to detecting and preventing the problem, described above, of man-in-the-middle replays of integrity-protected (e.g., digitally signed) messages. As described above, a convention UE is unable to tell the difference between an original digitally signed message from a legitimate base station, on the one hand, and a replay of that same message from man-in-the-middle false base station, on the other hand. According to the innovative sequencing techniques described herein though, a particular UE 102 will be able to discern between the two messages.

More particularly, due to the expected delay incurred for the false station to rebroadcast the message, UE 102 will expect to receive the original legitimate message prior to receiving the false rebroadcast message. Using the sequence number included in each message M, UE 102 (i.e., processor 112 thereof) is now able to reject the replayed message by determining that the original message had already been received (e.g., stored in memory 114), and that the newer received replay message containing the same sequence number is therefore not unique.

Additional broadcast message protection, and particularly in the case of mobile network implementations, may be desirable, such as in the case where some broadcast messages M may not be received by client 102, for example, due to a UE 102 going into idle mode, or moving out of the broadcast range of the respective message server 104. In such cases, UE 102 may not always receive the legitimate original message prior to the false replay message.

Some conventional techniques utilize timestamps to verify the timeliness of received messages. That is, in the case of mobile networks, broadcast messages may include a timestamp based on the time of the server-side (e.g., base station, eNB, gNB, etc.) broadcasting the message. These timestamps thus serve to eliminate the need to maintain the state for historical messages and the timestamps thereof. However, similar to the tampering challenges with respect to the broadcast messages, described above, the timestamps included therewith may also be subject to tampering. Additional advantageous techniques for protecting the integrity of timestamps are described further below with respect to FIG. 2.

Figure 2:
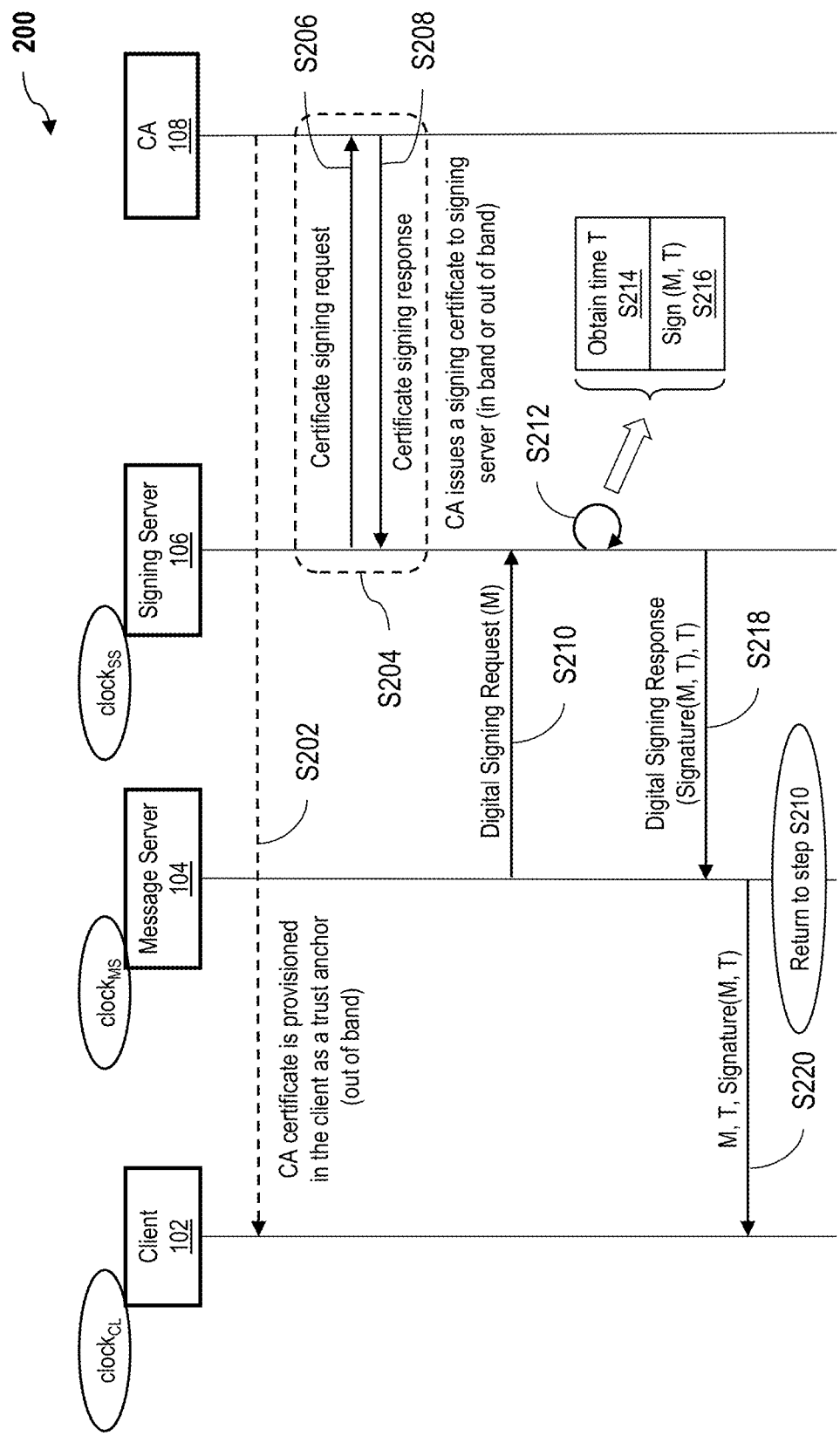
FIG. 2 is a sequence diagram of a message cryptographic signature process for the communication system depicted in FIG. 1.

FIG. 2 is a sequence diagram of a message cryptographic signature process 200 for communication system 100, FIG. 1. In the exemplary embodiment depicted in FIG. 2, process 200 is illustrated with respect to client 102, message server 104, signing server 106, and CA 108 of system 100.

In an embodiment, several steps or substeps may optionally be executed separately from process 200, or as preliminary steps thereof. For example, in step S202, CA 108 provisions a certificate in client 102 (e.g., within memory 114) as a trust anchor. In an embodiment of step S202, the certificate from CA 108 is provisioned out of band. In the case where client 102 is a UE, for example, the certificate may be received indirectly, such as through a low level connection with a nearby AP (e.g., or an eNB for a 3GPP network), through which the UE transmits a certificate request over an Extensible Authentication Protocol (EAP) for the AP to then forward over the network to an EAP authenticator, which may then route the request to the appropriate PKI portal to CA 108. An encapsulated certificate response may then be transmitted to the UE in a reverse fashion.

Additionally, in step S204, CA 108 may optionally issue a signing certificate to signing server 106 as a separate subprocess, or as additional preliminary steps to process 200. In some embodiments, step S204 is performed in band. In other embodiments, step S204 is performed out of band, similarly to step S202. In an exemplary embodiment, step S204 includes a first substep S206, in which signing server 106 transmits a certificate signing request to CA 108, and a second substep S208, in which CA 108 transmits a certificate signing response to signing server 106 that includes the signing certificate. In an exemplary embodiment, steps S202 through S208 are performed prior to signing server 106 receiving a message M from message server 104.

In the exemplary embodiment depicted in FIG. 2, cryptographic signature process 200 begins at step S210, in which message server 104 transmits a digital signing request, including the message M, to signing server 106 for digital signature. In step S212, signing server 106 executes a signature subprocess to respond to the digital signing request from message server 104. In an exemplary embodiment, step S212 includes a first substep S214, in which signing server 106 obtains a timestamp value T corresponding to the time the message M was sent from message server 104 (e.g., according to message server clock$_{MS}$), or according to the time the message M was received by signing server 106 (e.g., according to signing server clock$_{SS}$). In this embodiment, step S212 includes a second substep S216, in which signing server 106 cryptographically signs not only the message M, but also the timestamp value T, thereby providing an additional layer of integrity to not only the message M, but also the timestamp T.

In step S218, signing server 106 transmits a digital signing response to message server 104, which includes the original timestamp T, and both a cryptographically signed message M and a cryptographically signed timestamp T. In step S220, message server 104 broadcasts the original message M and timestamp T to client 102, along with the digitally signed message M and digitally signed timestamp T. Process 200 may then return to step S210, to repeat the cryptographic signature processing of the next message from message server 104. According to this innovative signature technique, client 102 is able to efficiently verify that the received message M and received timestamp T correspond to the digitally signed message and timestamp from signing server 106. Such verification may be performed in several ways.

For example, after receiving a broadcast message M, client 102 (e.g., a UE) may obtain its own local time (e.g., from client clockc$_L$), and then use this local time to verify the timestamp T included in the message M. If the difference in time between the local time and the timestamp T is within a predetermined acceptable range, processor 112 of client 102 may determine that the received message is considered to be fresh, and thus legitimate. This exemplary verification technique is of particular value where the time is well synchronized between client 102 and message server 104, since this technique would not require any state to be maintained on the client-side.

In some instances though, time synchronization between client and server is particularly challenging in global mobile networks that may include millions of base stations, as well as billions of UEs from many different vendors.

Accordingly, in another exemplary embodiment, message timeliness may alternatively be verified based on the local times of both the particular client 102 and respective message server 104 involved in the broadcast message communication.

As an illustrative example, a UE A is in communication with a base station B, from which a message m_i is periodically broadcast with a timestamp tb_i (e.g., message server clock$_{MS}$). In this example, it is assumed that the message m_i including the timestamp tb_i cannot be tampered with, since both are integrity-protected by a digital signature according to process 200. Thus, the first time the broadcast message m_i(tb_i) is received by A from B, the processor of A is able check the timestamp tb_i against its own local time ta_i (e.g., client clock$_{CL}$). Where time synchronization between A and B is reliable, A is able to accept the message after verifying this check. In the case where the time synchronization is not known though, A may alternatively waive the importance of accepting the message from B against the risk of rejecting the message. If the importance of accepting the message outweighs the risk of rejecting the message, A will accept m_i.

Further to this example, once the message is accepted, A stores the values (B, tb_i, ta_i) in a trusted storage (e.g., memory 114) where only the executable instructions of the software processing for the broadcast messages (e.g., through processor 112) is allowed to access and write. In some embodiments, the memory of A may further store a state value (e.g., trusted or untrusted), and/or other attributes of the received message (e.g., expiration time). In this manner, such memory entries may be flagged as trusted once verified, for example, after authentication with the network of system 100. According to this example, upon receipt by A of a subsequent message m_j(tb_j) from B, A may be further configured to again obtain its own local time taj of receipt, and then verify m_j against the m_i stored in memory.

An exemplary coding scheme for computer-executable instructions for performing this verification may be according to the following:

If tb_j>tb_i,
{
    Xb=tb_j−tb_i; /* time elapse in B */
}
Else
{

```
    m_j is not fresh; /* replay attacks, logging */
    reject and return
}
if (taj>ta_i )
{
    Xa=ta_j-ta_i /* time elapse in A */
}
Else
{
    A's time has been manipulated; /* logging, alerting */
}
/* check tb_j against the network time Tn */
If |ta_j-tb_j|<Y
{
    M_j is fresh;
    ta_i=ta_j /* update the stored time for A */
    tb_i=tb_j /* update the stored time for B */
}
Else
{
    M_j is not fresh, reject.
}
```

In at least one embodiment, each client 102 may be configured to utilize only the server-side time. That is, further to the example described immediately above, each client A may maintain the server time (e.g., $clock_{MS}$) Tn based on the timestamp tb_i included in each broadcast message m_i. In this manner, the time of the broadcast message may be the timestamp used for verifying the message freshness, or may be based on other time information included in the message for time synchronization purposes.

In an alternative embodiment, a particular client 102 (e.g., a UE) may maintain a single-server time, which is updated upon receipt of additional broadcast messages from that particular message server 104 (e.g., a base station). It may be noted though, that a challenge to utilization of a single-server time arises in the case where, if any base station is compromised and its time is manipulated (e.g., changed to a future time), the single-server time maintained by the UE would also be similarly manipulated upon receipt of a broadcast message from the compromised base station. In an exemplary embodiment, this threat is mitigated by further enabling client 102 to check the consistency of timestamps received among broadcasting messages from multiple message servers 104, and then update the server time accordingly.

In the case of a mobile network, the efficacy of this technique may vary according to the number of base stations available to the UE. For example, where only one base station/server is available to the UE, the UE will check the server time against its own local clock for consistency. In the case where two (or more) servers are available to the UE, both (or all) of their times may be checked against each other, as well as against the local clock time of the UE. If the times from the different servers are consistent with one another, either (or any) of the server times may be utilized to update the value Tn. Alternatively, an average of the server times may be used to update Tn. Where more than two servers are available, and where one server time is significantly different from the other servers, the outlying server time may be considered erroneous, and would therefore not be used to update Tn.

Further to this example, client 102 may also be configured to maintain multiple server times (e.g., the timestamps from multiple different $clock_{SMS}$). Depending on the number of server times that are available, the multiple server times may be maintained according to a variety of different scenarios that may be configured at the client-side. Thus, for the simplified case of client 102 maintaining two different server times can be maintained, client 102 may desire to maintain one server time for its own home network, and the other server time for non-home networks in which client 102 may operate. In this scenario, each server time may then be separately updated based on the time information received in the messages from the different message servers 104 (e.g., base stations) of the respective home network or non-home network. In an exemplary embodiment, each such separate update may individually be according to the single-server example described above.

In the exemplary embodiment, system 100 may be further configured to protect all received time information, as well as other state information, which is used to generate and validate timestamps or time counters, so that only an authorized party is able to access and modify the time information. As one illustrative example, individual processors of claim 102, message server 104, and/or signing server 106 are configured such that only a particular software module responsible for using/processing the time information is granted access to the time information and/or other related state information.

For the embodiments described herein, the respective digital signatures may be based on asymmetric cryptographic techniques utilizing a keypair having a public and a private key, such as PKI, and may be irrespective of the particular asymmetric algorithm used. In some embodiments, the public key is in a raw format. In other embodiments, the public key may be in a certificate format (e.g., an X.509 certificate). In the case where a raw public key utilized, the root public key may additionally contain annotating information, such as a key identifier.

The public keys utilized by the embodiments herein may be (i) flat, or (ii) hierarchical (e.g., a certificate chain). In the case where the public key is hierarchical, the hierarchical key structure(s) may take several forms. For example, an operator may implement its own independent key hierarchy. In this case, the operator may have its own root key, and then use that root key to certify the next intermediate keys, as well as subsequent keys thereafter. In the case where the keys are in certificate format, the operator would utilize the PKI to manage the lifecycle of the certificates as its own CA, or may alternatively outsource the PKI to a trusted third party CA (e.g., CA 108).

Alternatively, system 100 may utilize a trusted third party, such as a Global System for Mobile communications Association (GSMA) server as the root of the key hierarchy. In this example, some operators within system 100 may maintain child sub-key hierarchies under the root of the key hierarchy. In some embodiments, multiple roots may coexist, and each such root may operate to serve a particular subset of operators. In at least one embodiment, trusted third party roots may further coexist with the individual operator root.

In the case of a flat public key structure, trust in each public key must be established individually, as opposed to the hierarchical public key structure, where trust may be established directly in a leaf public key (i.e., the associated private key that the used to sign broadcasting messages), or indirectly from the trust of any one of its predecessor public keys, including, for example, an intermediate public key or the root public key. In some embodiments, trust in a public key is established on-the-fly. In other embodiments, trust in a public key is established by pre-configuration.

In the case of on-the-fly trust, a public key may be trusted when the key is first received from a particular message server/base station 104, and then stored locally (e.g., memory 114, FIG. 1) as a trusted key. Accordingly, upon receipt of a subsequent message from the same message server 104, that client 102 may check the signing key of the new message against the stored trust anchor.

Alternatively, in the case where a corresponding trust anchor does not exist on the client-side (i.e., not stored in memory 114), the digitally signed message may not be verified for its signature according to the techniques described immediately above. In this case, client 102 may instead proceed to establish a mutually-authenticated connection with the network of system 100. Upon successful connection, the network may then send client 102 a trusted public key for the particular message server 104, or may send client 102 a list of public keys for multiple servers/base stations 104. In an exemplary embodiment, the mutually-authenticated connection is established and the public key(s) is(are) sent during device provisioning (e.g., step S202), or alternatively, after the deployment of devices, such as when a user starts to use the respective electronic device or module of client 102. In the case where a list of trusted public keys is sent, the list may be pre-configured within client 102 (e.g., inside of a Universal Subscriber Identity Module (USIM) or Mobile Equipment (ME)) by a trusted party, such as a USIM vendor, a UE vendor, or a network operator.

Where a hierarchical key structure is implemented, multiple public keys may be required in order to validate a digital signature if the public key associated with a signing key is not itself directly trusted. In this case, if the public keys are in the format of public key certificates, signing server 106 and CA 108 may operate to implement key chaining through a certificate chain to establish trust in the signing key.

In the case where raw public keys are utilized, the public keys may alternatively be annotated with additional information that may be to establish the trust in a signing key.

Accordingly, one key chaining technique may utilize a higher level key to digitally sign a lower level key, and then include this digital signature along with the raw public key. An illustrative example of such a keychain may be according to:

key3, key3-signature-signed-by-key2|
key2, key2-signature-signed-by-key1|
key1, key1-signature-signed-by-trusted-anchor key Thus, for this example, where key3 is used to sign a particular broadcasting message M, the key3-signed message is further signed by key2, key2 is further signed by key1, which is itself signed by a trusted anchor provisioned inside the device (e.g., step S202).

The present embodiments further implement one of two protection models to protect the private key that is used to digitally sign a broadcast message M: (1) local signing; and (2) remote signing.

For the local signing model, a particular message server 104 (e.g., a gNB) may be configured to locally store (in a memory device thereof, not shown) a private key, and then use the stored private key to sign the broadcast messages. In an exemplary embodiment, this private key is further protected within the server utilizing access control and/or a trusted execution environment. For example, the digitally signature process for a broadcast message may be executed within the trusted execution environment (e.g., SGX or TrustZone). According to this example, if a gNB is compromised, the private key may be still nevertheless protected to some degree, depending how much control of the gNB is obtained by an compromising attacker. According to this model, message server 104 and signing server 106 may constitute a single server unit.

In contrast, for the remote signing model, due to the lack of physical security available to some servers (e.g., gNB), an additional layer of security is provided through having the message signing process performed by a central signing server 106 (e.g., in a secure environment), which may be separate and remote from the individual message servers 104. Thus, in the case of a mobile network, a gNB is able to send a message, or a set of messages, to signing server 106 to be signed. Signing server 106 is then able to render the appropriate decision steps or calculations necessary to determine whether to sign the received messages from the digital signing requests (e.g., step S210) from the gNB 104. Accordingly, when signing server 106 determines that a message is to be signed, signing server 106 uses its private key to sign the particular message and return that signed message to the gNB 104 for broadcast to a particular client/UE 102.

In an exemplary embodiment, the digital signing request (e.g., step S210) may be sent transmitted to signing server 106 any time before the message needs to be broadcast to one or more clients 102. In at least one embodiment, in the case where a sequence number and/or time-variant is/are included in the signed message from signing server 106, message server 104 may be further configured such that such sequence numbers and/or time-variants are pre-computed at message server 104, and then included in the digital signing request of step S210.

In some embodiments, the decision(s) from signing server 106 as to whether to sign a particular message may be based on the policy or result of the attestation of the particular message server 104 transmitting the digital signing request. For example, if a gNB is considered to be in a not-secure state, signing server 106 may reject the digital signing request for the message contained therein. According to this advantageous embodiment, by implementing remote signing by a central signing server 106, the private key that is used for message signing is stored in the remote server of signing server 106, and not locally in a message server/gNB 104, thereby preventing the risk to the private key from a compromised message server 104, such as in the case of a gNB that may lack physical security.

According to the innovative systems and methods described above, significant improvements over conventional broadcast message protection techniques are demonstrated. The embodiments herein, through the innovative disposition of a central signing server, provide advantageous security protection to keys and certificates that are rendered inaccessible to attackers that may compromise various physically-unsecured servers/stations. Through the additional protection of both the broadcast message and the timestamp thereof, the embodiments herein additionally provide advantageous capability for the client to itself verify the integrity, uniqueness, and freshness of received broadcast messages. These respective server-side and client-side broadcast message protection improvements are further advantageous in that they may be implemented separately, or together.

Additional implementations and variations on the above systems and methods are described further below with respect to FIGS. 3 and 4.

Figure 3:
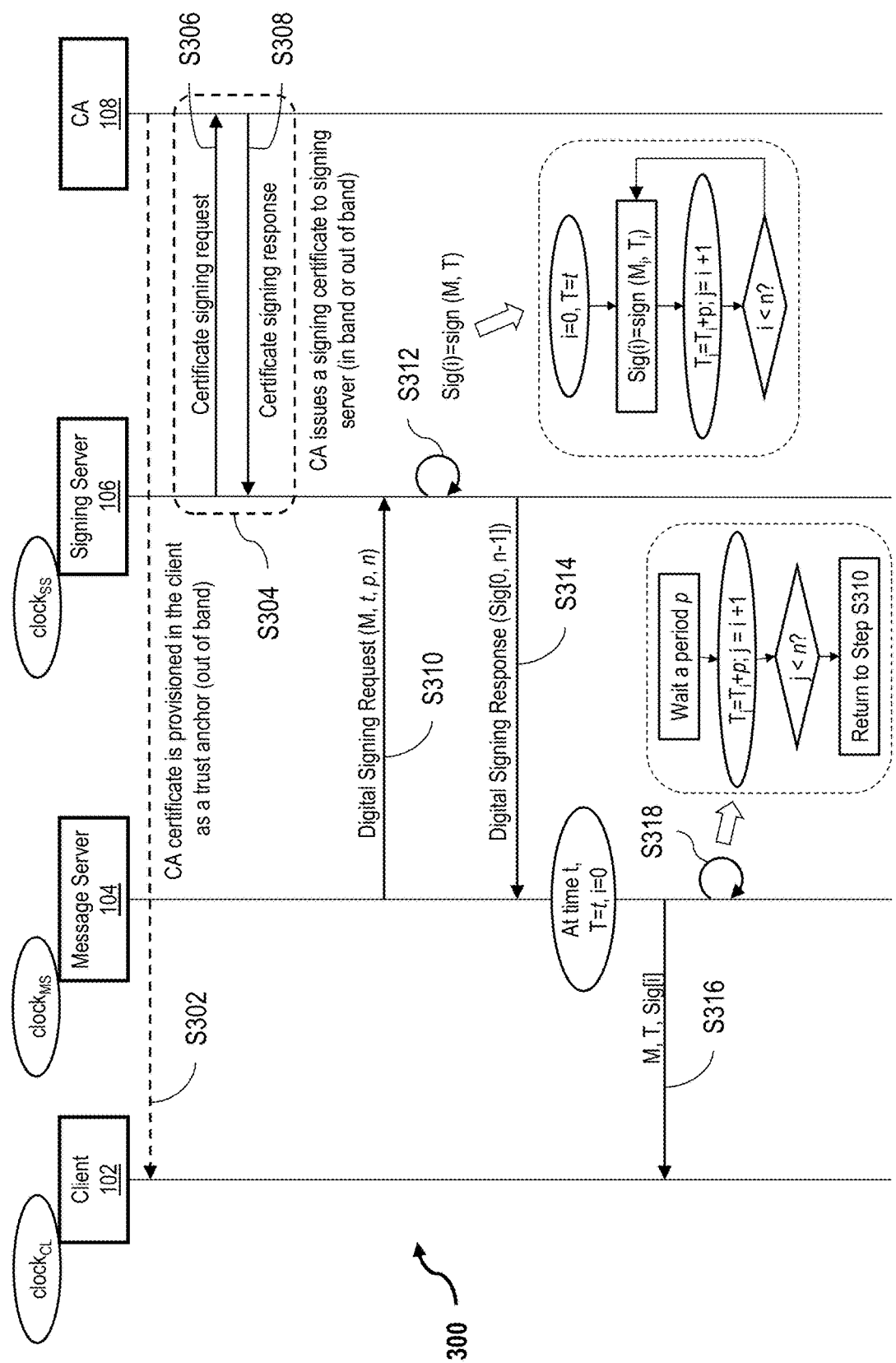
FIG. 3 is a sequence diagram of an iterative message cryptographic signature process for the communication system depicted in FIG. 1.

FIG. 3 is a sequence diagram of an iterative message cryptographic signature process 300 for communication system 100, FIG. 1. In the exemplary embodiment depicted in FIG. 3, process 300 is similar in many respects to process 200, FIG. 2, and is also implemented with respect to client 102, message server 104, signing server 106, and CA 108 of system 100, and may optionally include steps S302 and S304, and substeps S306 and S308 of step S304, as a preliminary subprocess of process 300, or as individual processing steps separate from process 300.

More particularly, in step S302, CA 108 provisions a certificate in client 102 as a trust anchor (e.g., out of band), similar to step S202, FIG. 2. In step S304, CA 108 may, similar to step S204, FIG. 2, issue a signing certificate to signing server 106 (e.g., in band or out of band), according to a first substep S306, in which signing server 106 transmits a certificate signing request to CA 108, and a second substep S308, in which CA 108 transmits a certificate signing response to signing server 106 including the signing certificate. As described above though, the signing request of substep S306 and the signing response of substep S308 may be certificate-based or utilize raw public keys, and according to flat or hierarchical key structures and key chaining techniques.

Process 300 differs though, from process 200, FIG. 2, in that process 300 illustrates the case where a particular message server 104 sends a message M to signing server 106 along with timing information regarding when the first signed message is to be sent out to individual clients 102, the time interval for the next signed message to be sent to clients, and also the number of times that each message shall be signed. In this illustrative example, the time at which the first signed message is to be sent to the client is represented by t, p represents the time interval after which each next signed message is sent, and n represents the total number of times that a message M shall be signed, along with the corresponding time at which there message M will be sent to clients.

Thus, in the exemplary embodiment depicted in FIG. 3, cryptographic signature process 300 begins at step S310, in which message server 104 transmits a digital signing request, including the message M, the initial time t, the time interval p, and the value n, to signing server 106 for digital signature of the message M.

In step S312 (assuming that message server 104 is determined to not be compromised), signing server 106 digitally signs the message M contained within the digital signing request from message server 104, and also a timestamp T, similar to step S212, FIG. 2. Step S312 though, differs from step S212 in that, for the first message $M_i$ to be sent to client 102 (e.g., i=0), instead of obtaining a server timestamp, signing server 106 uses the initial time t, which is included in the digital signing request, as the timestamp T to be signed (i.e., T=t). In an exemplary embodiment of step S312, after signing ($M_i$, T), signing server 106 may be further configured to increment the timestamp value T by the time interval p (i.e., $T_j=T_i+p$), and increment the sequence value of the message M by 1 (i.e., j=i+1). If j is less than the value n, signing server 106 may then sign the next message $M_j$ to be sent to client 102 (or the next message in a group of messages sent by message server 104 for digital signatures).

In step S314, signing server 106 transmits a digital signing response to message server 104, which includes both a digitally signed message M and a digitally signed timestamp T. It may be noted that, for this example, signing server 106 need not also transmit the unsigned value for the timestamp T in addition to the digitally signed timestamp T, because at time t, T=t, and message server 104 already has the time t, which was sent to signing server 106 in the original digital signing request from step S310. Accordingly, at time t, in step S316, message server 104 broadcasts the first message $M_i$ and timestamp $T_i$ to client 102, along with the first digitally signed message $M_i$ and digitally signed timestamp $T_i$.

In step S318, process 300 may then instruct message server 104 to also increment the time value t by the time interval p such that $T_j=T_i+p$ and j=i+1. In this manner, message server 104 and signing server 106 remain coordinated by sequencing, and irrespective of synchronization between their respective clocks. In an exemplary embodiment of step S318, if j is less than the value for n, at message server 104, process 300 may then return to step S310, and then repeat the iterative cryptographic signature processing of the next message M to be sent to client 102.

The exemplary embodiment depicted in FIG. 3 thus illustrates an advantageous implementation of the embodiments described above, but in the case where it is desirable to broadcast the messages according to a particular timing schedule, and where synchronization between the respective clocks within system 100 is less important, or impractical.

Figure 4:
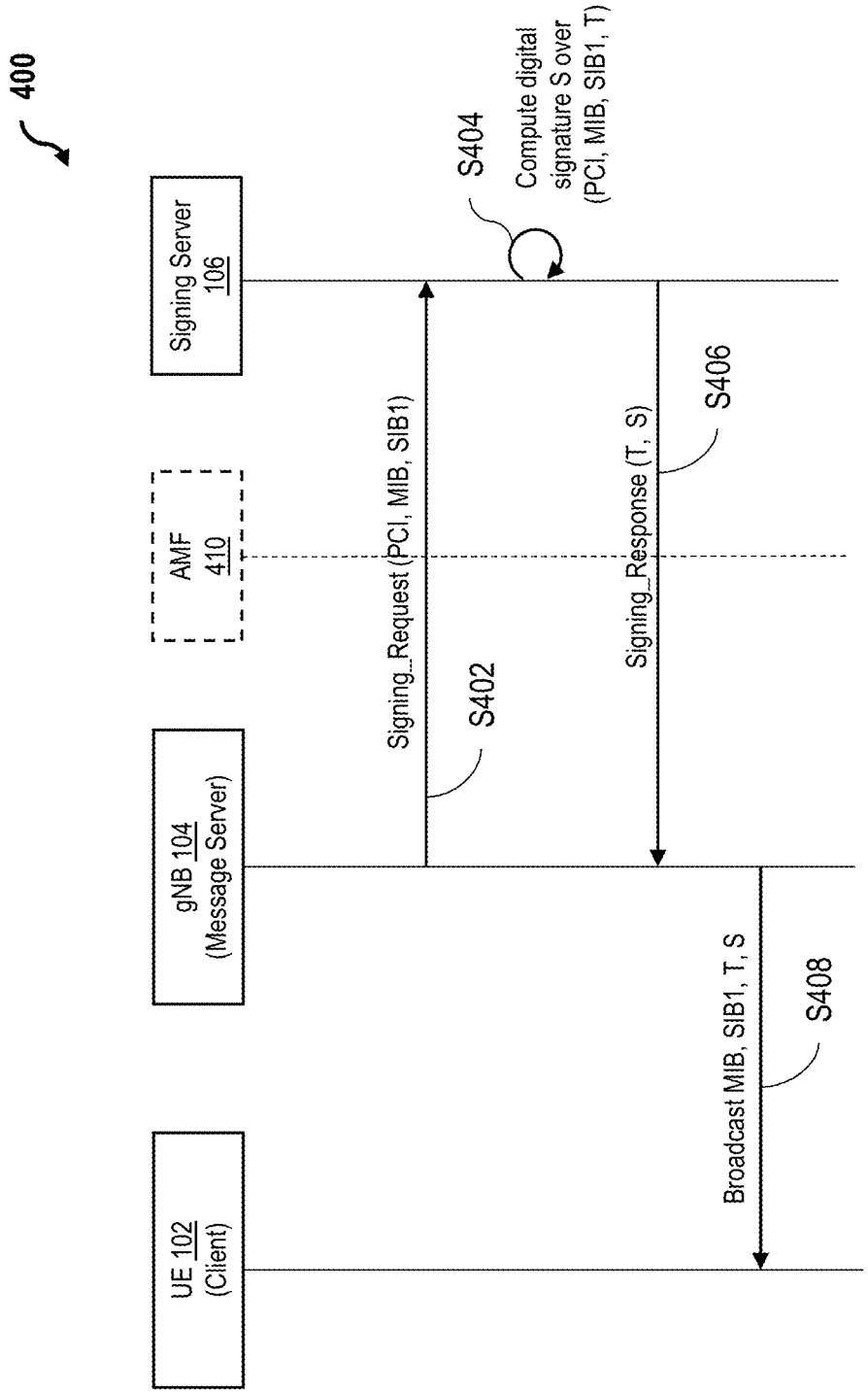
FIG. 4 is a sequence diagram of a message block cryptographic signature process for a mobile network architecture of the communication system depicted in FIG. 1.

FIG. 4 is a sequence diagram of a message block cryptographic signature process 400 for a mobile network architecture of communication system 100, FIG. 1. In the exemplary embodiment depicted in FIG. 4, process 400 is similar in several respects to process 200, FIG. 2, and process 300, FIG. 3, and is also implemented with respect to client 102, message server 104, and signing server 106. In this particular example though, client 102 is depicted as a UE, and message server 104 is depicted as a gNB. Process 400 differs though, from processes 200 and 300, in that process 400 illustrates an exemplary case where digital signature protection is sought for a selected subset of message blocks of a message M.

Accordingly, message block cryptographic signature process 400 begins at step S402, in which gNB 104 transmits a digital signing request, including the Physical layer Cell ID (PCI) block, the MIB, and the first SIB (i.e., SIB1) of a message M, to signing server 106 for digital signature of the message blocks. In step S404 (assuming that gNB 104 is determined to not be compromised), signing server 106 computes the digital signature S over each of the message blocks PCI, MIB, and SIB1, and also over a timestamp T, which may be obtained or sequenced according to one or of the subprocesses described above. In an exemplary embodiment of step S404, signing server 106 signs the message block and timestamp such that S=sign(PCI, MIB, SIB1, T).

In step S406, signing server 106 transmits a digital signing response to gNB 104, which includes both the computed digital signature S and an unsigned timestamp T. Accordingly, in step S408, gNB 104 broadcasts the MIB and SIB1 message blocks to UE 102, along with the unsigned timestamp T and the computed digital signature S, which includes a digitally signed PCI, MIB, SIB1, and timestamp T. In an exemplary embodiment, one or more of the communication steps between gNB 104 and signing server 106 may be optionally facilitated through use of an access and mobility management function (AMF) 410, such as an AMF used in mobile network.

According to this exemplary embodiment, UE 102 is thus enabled to verify the message integrity, uniqueness, and freshness of both the MIB and SIB1 message blocks of the message similarly to the client-side message verification techniques described above. According to this exemplary embodiment, the person of ordinary skill in the art will comprehend that the principles described herein are not limited to single messages or groups of messages, or to only specific types of communication networks or systems, but are instead broadly applicable to the broadcasting of messages and groups of messages in general, and/or the message block components thereof.

Figure 5:
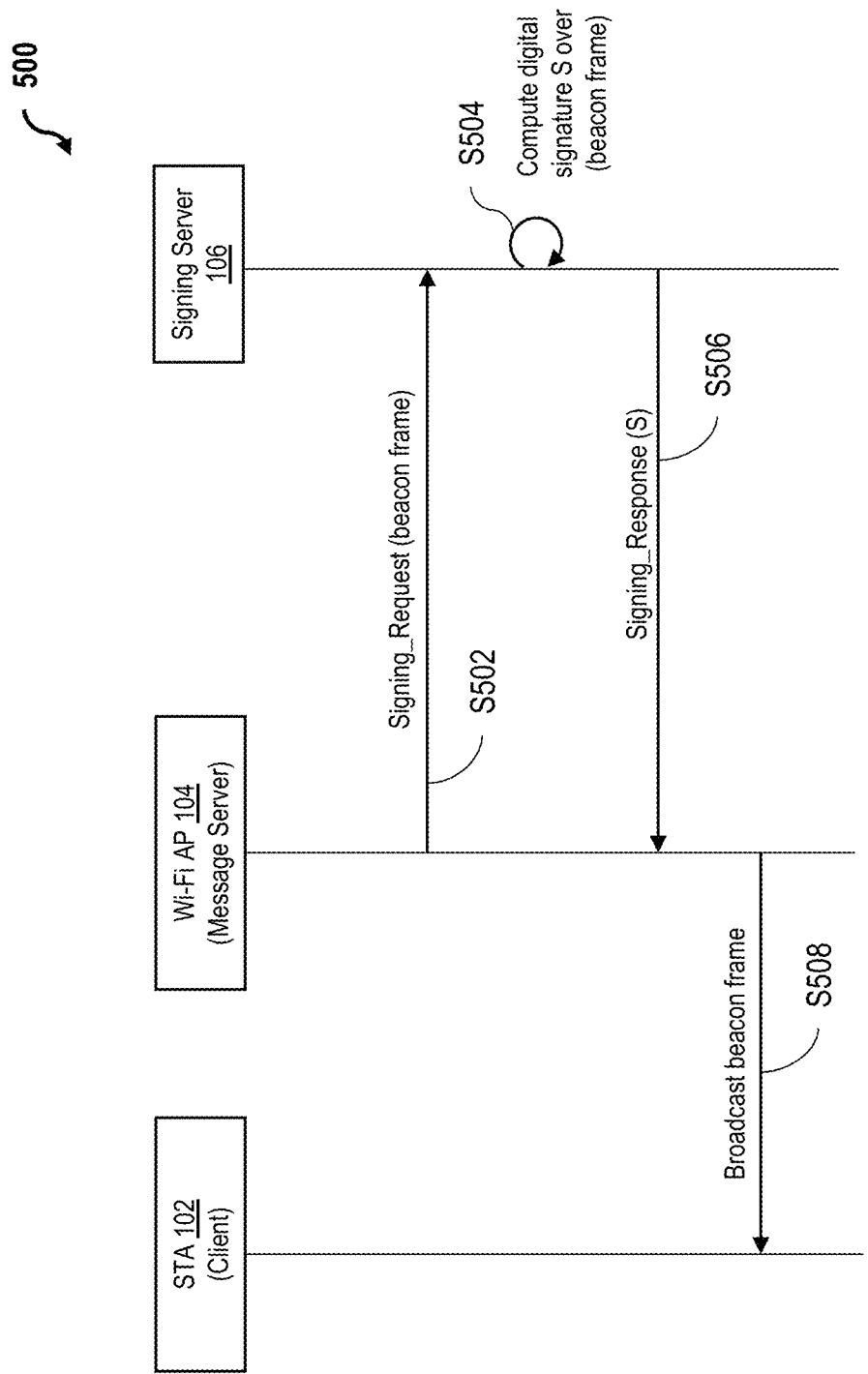
FIG. 5 is a sequence diagram of a beacon frame cryptographic signature process for a Wi-Fi network architecture of the communication system depicted in FIG. 1.

FIG. 5 is a sequence diagram of a beacon frame cryptographic signature process 500 for a Wi-Fi network architecture of communication system 100, FIG. 1. In the exemplary embodiment depicted in FIG. 5, process 500 is similar in several respects to process 400, FIG. 4, and is also implemented with respect to client 102, message server 104, and signing server 106. In this particular example though, client 102 is depicted as a STA, and message server 104 is depicted as a Wi-Fi AP. Process 500 further differs from process 400 in that process 500 illustrates an exemplary case where digital signature protection is sought for a beacon frame of a message M.

Accordingly, beacon frame cryptographic signature process 500 begins at step S502, in which AP 104 transmits a digital signing request, including the beacon frame of a message M, to signing server 106 for digital signature. In step S504 (assuming that AP 104 is determined to not be compromised), signing server 106 computes the digital signature S over the beacon frame. It may be noted that, because a beacon frame transmitted by a Wi-Fi AP includes its own timestamp, signing server 106 need not separately obtain the timestamp of the message M. A digital signature of the beacon frame will also sign the included timestamp therein. In step S506, signing server 106 transmits a digital signing response to AP 104, which need only include the computed digital signature S. Accordingly, in step S508, AP 104 broadcasts the beacon frame to STA 102.

According to this exemplary embodiment, STA 102 is thus enabled to verify the message integrity, uniqueness, and freshness of the beacon frame in a manner similar to the client-side message verification techniques described above. According to this exemplary embodiment, the person of ordinary skill in the art will comprehend that the principles described herein are also not limited to single messages or groups of messages.

As illustrated in the several embodiments described above, a timestamp may be signed separately from, or together with, an associated broadcast message or message blocks/portions thereof. Protection may thus be provided by a single signature (i.e., when signed together), or by two or more separate signatures (i.e., when signed separately, or as part of a key chain).

The present embodiments are therefore of particular usefulness in the case where a client receives broadcast messages from multiple messages servers. For example, a UE may scan multiple cells in a mobile network, or a STA may scan multiple APs in a Wi-Fi network.

The innovative timestamp protection techniques described herein further provide additional verification capabilities across the relevant network, since, according to the present systems and methods, a timestamp associated with a broadcast message may be checked against any one of: (a) the local time of the client; (b) a timestamp associated with a previously received broadcast message from the same message server; and (c) a timestamp associated with a broadcast message from a different message server.

Delegated Digital Signing of Communication Messages

As described above, in conventional cellular communication networks, communication messages are classified into broadcasting and unicasting messages. However, these conventional cellular networks do not protect broadcasting messages for integrity, and only protect unicasting messages after authentication and key agreements (AKA). Some conventional schemes utilizing digital signature based solutions have been proposed to protect broadcasting messages and unicasting messages. These conventional proposals, however, all require that the entities (e.g., gNB) originating the messages also have to compute and generate the digital signatures of the originated messages, which presents several challenges. First, each entity originating the messages must generate, or be configured with, its own public and private key pair, which adds significant overhead costs, as well as risk, for the additional key management.

Second, significant additional complexity is introduced in the establishment of trust for the signing of keys. The following systems and methods provide solutions that overcome these conventional challenges.

Figure 6:
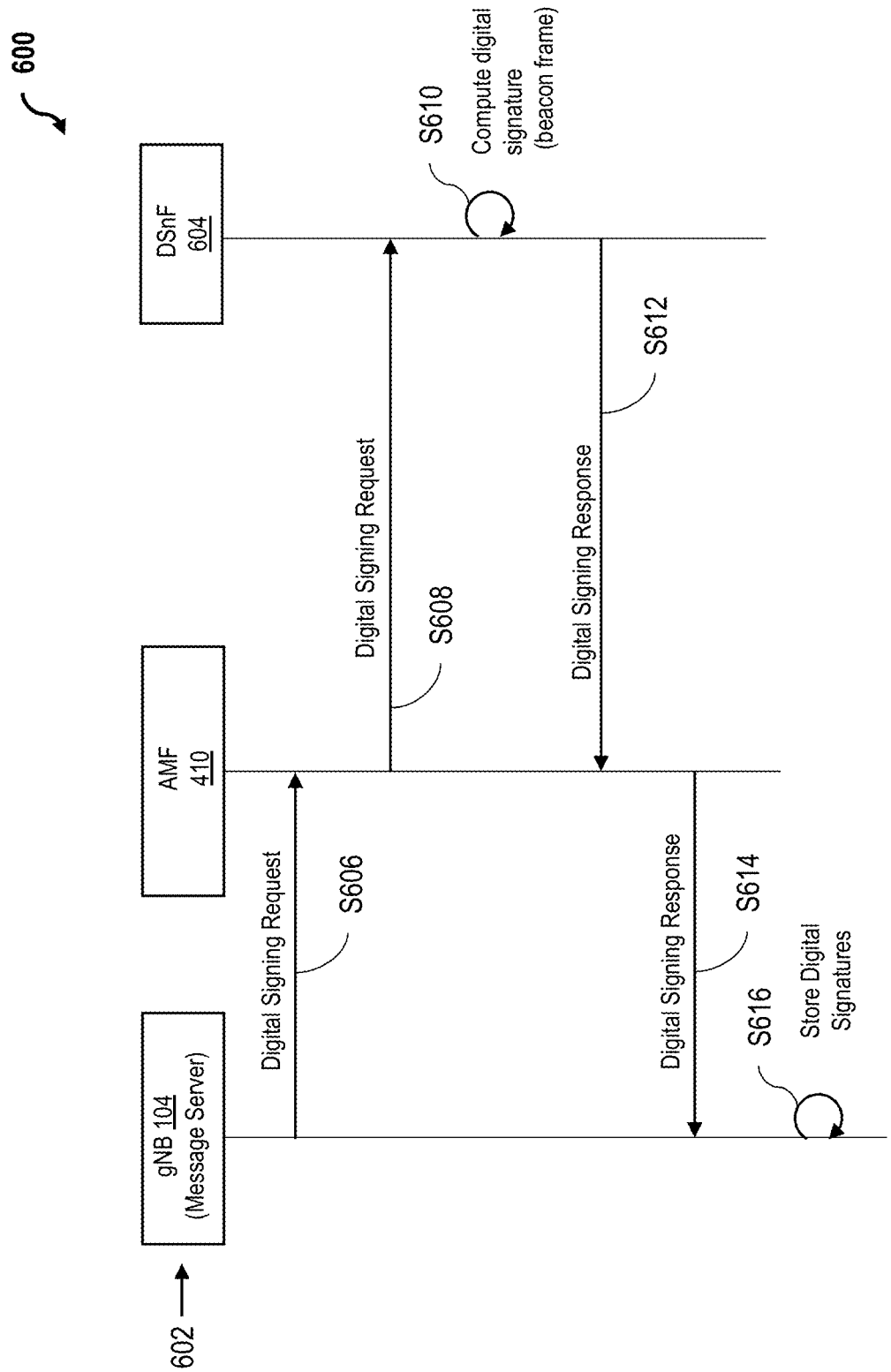
FIG. 6 is a sequence diagram of a message block cryptographic signature process for the mobile network architecture of the communication system depicted in FIG. 1.

FIG. 6 is a sequence diagram of a message block cryptographic signature process 600 for a mobile network architecture 602 of communication system 100, FIG. 1. According to process 600, the digital signing of messages may be delegated to a third party different from the entity that originates the messages. For the purposes of the following description, the digital signing entity is referred to as a Digital Signing Network Function (DSnF) 604. According to process 600, any entity, such as gNB 104, FIG. 1, or a network function (e.g., AMF 410, a SEcurity Anchor Function (SEAF), etc.), is enabled to send a message, whether as a broadcasting message or a unicasting message, to DSnF 604 to be digitally signed. In some embodiments, multiple messages may be sent to DSnF 604 in a single request to be signed individually. In other embodiments, a single message may be sent to DSnF 604 to be signed multiple times (e.g., each with a different timing variant such as a time counter or a timestamp).

In the exemplary embodiment depicted in FIG. 6, process 600 is similar in several respects to process 200, FIG. 2, process 300, FIG. 3, and process 400, FIG. 4, and may be similarly implemented with respect to message server/gNB 104 and AMF 410. Different from processes 200, 300, 400, DSnF 604 functions in the place of signing server 106. Process 600 is further described with respect to an exemplary case where digital signature protection is sought by one of gNB 104 and/or AMF 410. The person of ordinary skill in the art will understand though, that this exemplary case is described by way of illustration, and not in a limiting sense.

In an exemplary embodiment, DSnF 604 exposes service-based interfaces to provide digital signing services to other network functions. Process 600 begins at step S606, in which gNB 104 sends a digital signing request to AMF 410. In step S608, AMF 410 forwards the digital signing request to DSnF 604. In exemplary embodiments of steps S606 and S608, the respective digital signing requests enable may represent a request for a single digital signature, or for a set of digital signatures. In the case of a single digital signature request, the digital signing requests of steps S606 and S608 may include a single group of information elements that may require digital signatures, for example, [SIB1, S132, Cell_ID, Downlink_Frequency, Time_Counter].

To request a set of digital signatures, the digital signing requests S606 and S608 may contain a set of information element groups, each of which may be digitally signed. In an embodiment, a set of information element groups may be aggregated to reduce the size of the request. For example, if all element groups contain the same information elements except the Time_Counter parameter, the set may be aggregated as, for example, [SIB1, SIB2, Cell_ID, Downlink Frequency]| Initial_Time_Counter, Increment_of_Counter, Number_of_Increments]. According to this advantageous implementation, a cell is enabled to use a single request to obtain a plurality of digital signatures for a particular period of time (e.g., an hour).

In an embodiment of step S608, upon receive a digital signing request, DSnF 604 selects a particular signing key (e.g., in a case where multiple signing keys are supported) and, in step S610, computes the digital signature over the information elements to be protected.

In step S612, DSnF 604 transmits a digital signing response to AMF 410, and in step S614, AMF 410 sends a digital signing response to gNB 104. In both steps S612 and S614, the digital signing responses may include a single digital signature, or a set of the digital signatures, as well as with other information (e.g., a public key identifier) to facilitate verification of the digital signatures.

In an exemplary embodiment, process 600 includes an additional step S616, in which the received digital signing response(s) are stored in a repository or memory device of gNB 104 for future use, which may be particularly useful in the case where a set of multiple signatures is received.

In at least one exemplary embodiment, gNB 104 invokes DSnF 604 to digitally sign messages which gNB 104 will transmit to various receiving devices, such as UE 102, FIG. 1. The person of ordinary skill in the art will appreciate that process 600 is described with respect to broadcast messages by way of illustration, and not in a limiting sense. Process 600 is applicable to other message types, such as paging messages or unicasting messages (e.g., Registration Reject) digital signing.

In at least one embodiment, step S606 (as well as step S608) is periodically repeated, i.e., gNB 104 periodically makes digital signing requests of DSnF 604 to obtain digital signatures of SIBs and stores (i.e., step S616) the received digital signatures from the respective digital signing responses in the repository or memory, where the stored digital signatures may then be subsequently retrieved for broadcasted along with the corresponding protected SIBs.

In some embodiments, gNB 104 further includes a digital signing client (not separately shown) to ensure that a digital signature is always available for an SIB under protection prior to the time slot the SIB is scheduled to be broadcasted.

In some embodiments of step S606, gNB 104 makes digital signing requests via N2 message to AMF 410, from which AMF 410 then generates a service request to DSnF 604. Alternatively, the client on gNB 104 may make a direct request to DSnF 604 via HTTP/HTTPS, or other protocols, supported by DSnF 604.

In an embodiment, the digital signing responses (e.g., steps S612 and S614), including the digital signatures thereof, may be returned directly to gNB 104 directly from DSnF 604 as a single step, or through a different network function than AMF 410 (e.g., an SEAF of a different AMF). In at least one embodiment, DSnF 604 is enabled to push digitally signed data to gNB 104 or other entities.

The entity performing the digital signing services (e.g., DSnF 604) for other entities (e.g., AMF 410 and/or gNB 104) is thus of particular usefulness in cellular networks, including present-day 4G and 5G networks, as well as developing network technologies, such as 5G-NR and 6G. For example, the relevant interface may be exposed by DSnF 604 to other network functions for requesting and responding to digital signing services. Such an interface may, for example, be disposed between gNB 104 and AMF 410 for requesting and responding to digital signing services. In this example, DSnF 604 may be enabled to push signed data to other network entities such as gNB 104 and/or AMF 410.

In the case where gNB 104 supports the integrity protection of system information by making periodic digital signing requests to DSnF 604, i.e., to obtain and store the digital signatures of SIBs for later retrieval, for non-occurring SIBs, gNB 104 may be configured to send the relevant signing request to DSnF 604 on demand.

In some embodiments, gNB 104 may itself be configured to act as the digital signing client to ensure that a digital signature is always available for an SIB under protection prior to the time slot the SIB is scheduled to be broadcasted. In such cases, gNB 104 may be configured to make the digital signing requests via an N2 message to AMF 410, which then subsequently generates a service request to DSnF 604. Alternatively, the client/gNB 104 may make a direct request to DSnF 604 via HTTPS where such requests are enabled and allowable.

In some embodiments, gNB 104 receives digital signing responses from DSnF 604 via AMF 410 over an N2 interface. In this example, DSnF 604 may also be configured to push the digitally signed data directly to gNB 104.

In some further embodiments, the digital signature of System Information can be carried in another, new SIB, which may include the digital signature along with supplement information to facilitate the verification of the digital signature. Examples of such supplemental information include without limitation, information elements: (i) indicating the SIBs that are being protected; (ii) for anti-reply attacks, such as PCI, downlink frequency, Time Counter, etc.; (iii) for selecting a public key for signature verification, such as key identifier information elements for constructing certificate chains if needed; and (iv) for signing algorithm selection if multiple digital signature algorithms are supported.

The embodiment depicted in FIG. 6 thus illustrates an overall process for message servers (e.g., gNB 104) to request digital signatures from a digital signing entity (e.g., DSnF 604). In the examples described above, the SIB digital signing requests/responses impact the N2 interface by consuming network bandwidth and adding processing overhead. However, the actual bandwidth consumption depends on the frequency of signing requests and responses exchanged between gNB 104 and AMF 410. In some embodiments, static fields may be signed by DSnF 604, whereas dynamic fields (such as used by single frequency networks, or SFNs) may be signed by gNB 104 (e.g., using secondary signing keys, such as a short-lived key pair of shorter key length, or symmetric keys). In other embodiments, the periodicity of DSnF 604 signing static fields and secondary signing keys may be the maximum duration of the SFN cycle, that is, 10.24 seconds (10 ms×1024). According to this example, DSnF-signed messages may be rebroadcasted for every 10.24 seconds.

In an embodiment, an SIB may have a maximal size of 2976 bits (i.e., 372 bytes), and the digital signature algorithm may be 256-bit ECDSA with a digital signature of 64 bytes. In this example, the digital signing response may also contain secondary signing keys, for example, a chain of 1023 keys of 256 bits each. In this example though, only the first key on the chain may need to be sent by DSnF 604 to gNB 104, since the rest of the relevant keys may be computed from this first key. In at least one embodiment, the last key of the chain may be signed by DSnF 604 as the anchor key, and the rest of the keys on the chain may then be used in reverse order to sign the relevant dynamic fields (e.g., SFN). In this case, a signing response may be 192 bytes (twice 64 bytes+32 bytes) considering only the signature and the secondary signing keys. If a short-lived key public key is used to sign dynamic field, the response would be larger. Therefore, without considering the overhead from other data (e.g., packet headers), the bandwidth consumption for each request and response would be 372 bytes and 64 bytes, respectively.

proportional to the number of requested signatures in each signing request. Estimates of bandwidth and processing overhead at AMF 410 are shown below in Table 1, and are based on estimates at gNB 104 having one configured cell, according to the illustrative examples described above.

TABLE 1

| Frequency of broadcasting a new signature | Total no. of signatures required per day | No. of signatures asked per signing request | Total no. of signing requests per day | Total bandwidth overhead (bytes) at gNB per day | No. of served gNBs per AMF | Total no. of messages processed at AMF | Total bandwidth overhead at AMF (bytes) |
|---|---|---|---|---|---|---|---|
| Every 10.24 seconds | 3600 × 24/10.24 = 8438 | 1 | 8438 | Signing Requests: 3.2M Signing responses: 0.8M | 100 | Signing requests from all gNB: = Signing responses to all gNB: = 843,800 | Signed requests from all gNB: 314M Signing responses to all gNB: 81M |
| | | | | | 1000 | Signing requests from all gNB: = Signing responses to all gNB: = 86,400,000 | Signed requests from all gNB: 32G Signing responses to all gNB: 800M |
| | | 60 (each request asks 60 signatures to be used for 10 minutes) | 6 × 24 = 144 | Signing Requests: 50K Signing responses: 0.8M | 100 | Signing requests from all gNB: = Signing responses to all gNB: = 144,000 | Signed requests from all gNB: 5.4M Signing responses to all gNB: 81M |
| | | | | | 1000 | Signing requests from all gNB: = Signing responses to all gNB: = 1,440,000 | Signed requests from all gNB: 53.6M Signig responses to all gNB: 800M |

Without considering response aggregation, there may be as many as 8438 (24×3600/10.24) signing requests and responses exchanged between gNB 104 and AMF 410, in this example. Without considering the bandwidth overhead from other accompanying data in each request and response, the total bandwidth consumption from signing requests and responses would consume approximately 3.2 MB and 0.8 MB, respectively. Thus, when the number of SIBs to be protected increases, the bandwidth consumption from a signing request also increases. When signing requests are aggregated though, the bandwidth consumption from a signing request may be reduced. For example, if each signing request asks for 60 digital signatures (to be used for next 10 minutes, in this example), the bandwidth consumption from sending signing requests may be reduced by 60-fold, or by at least 50 kilobytes per day.

From the perspective of AMF 410, a single AMF 410 may interact with a plurality of gNBs 104. Thus, the bandwidth consumption at AMF 410 may further be proportional to the number of individual gNBs 104 served, as well as the number of cells configured at each gNB 104, but inversely In the exemplary embodiments described above, gNB 104 may be configured to send signing requests and receive signing responses on a periodic basis.

Nevertheless, a constant connection between gNB 104 and AMF 410 not need be maintained to accomplish this periodic communication. Thus, for the example used above, gNB 104 only needs to be operably connected to, or in communication with, AMF 410 every 10 minutes to send/receive the signing requests/responses. Accordingly, the present embodiments are of particular utility where not only a constant connection is maintained between gNB 104 and AMF 410, but also in the case where the connection is closed and reopened for each such request.

In an embodiment, gNB 104 may be configured to request digital signatures and obtain short-lived keys from DSnF 604. In such instances, gNB 104 may utilize the obtained short-lived keys to sign dynamic fields (e.g., SFN). The gNB 104 may then broadcast the corresponding digital signatures along with relevant System Information (SI).

In the exemplary embodiment, using one entity, such as DSnF 604, to perform digital signing services to other entities advantageously enables DSnF 604 to act as an interface to other network functions for requesting and responding to digital signing services used in cellular networks (e.g., 4G, 5G, etc.). Similar to the examples described above, a particular interface may be disposed between gNB 104 and AMF 410 for requesting and responding to digital signing services, and/or DSnF 604 may be configured to push signed data to other network entities, such as gNB 104.

Messaging Trust Management

In an embodiment, the digital signatures of the present systems and methods may be generated by a private key, and may be verified by a corresponding public key. In the exemplary embodiment, public keys and trust anchors are distributed to UEs 102 for them to verify digitally signed system information. Such public keys may be distributed in the form of a raw key and/or a public key certificate. As described herein, a raw key includes a public key, and optionally additional data such as key identifier, expiration time, etc. A public key certificate, on the other hand, may be an X.509 certificate having a well-defined data structure supporting key life cycle management, key hierarchy, and key usage, among other functionalities.

In comparison with a public key certificate, a raw public key is considered less complex, of a smaller size, and is typically flat when not belonging to a key hierarchy. However, use of raw public keys presents significant challenges for trust anchor management. For example, in the case where each gNB 104 uses a unique public and private key pair, each such public key would need to be configured as a trust anchor for the respective UEs of that gNB (e.g., UEs 102, FIG. 1), which would then result in many trust anchors that become increasingly difficult to provision out of band. In some proposals, it is conceivable that multiple gNBs may share public/private key pairs to reduce the number of trust anchors; however, such practices would violate basic security principles relating to key separation.

As described herein, a public key certificate is considered to have rich semantics and to support key hierarchy, thereby enabling multiple public key certificates to be verified using a single trust anchor. Nevertheless, a typical public key certificate, such as an X.509v3 certificate, is significantly larger than a raw public key, and may not fit into a single SIB due to the size limitation of SIB in the physical layer. Moreover, a public key certificate generally requires verification of its revocation status, e.g., using Certificate Revocation List (CRL) or Online Certificate Status Protocol (OCSP). Both the CRL and OCSP, however, require network connectivity, which may not yet be established at the stage of SIB acquisition.

In an embodiment, the certificate revocation issue is addressed through use of short-lived public key certificates. Because a short-lived public key certificate has a short expiration time (e.g., a few hours), the revocation check may be skipped, based on the assumption that a compromised key will expire quickly. One challenge though, to the use of short-lived certificates is that new certificates need to be issued more frequently, thus requiring the issuing CA (e.g., CA 108, FIG. 1) to be online, and online operation CA raises further security risks that should be avoided, if possible.

To mitigate these security risks, in an exemplary embodiment, the present systems and methods advantageously implement a hybrid approach that combines the use of public key certificates with raw public keys. More specifically, a public key certificate may be issued to an entity at the core network, and this core network entity (e.g., DSnF 604) uses its private key to sign a gNB public key, as well as other minimal data, such as expiration time, key usage, etc. The signed object is then valid for a short period of time (e.g., a few hours), and is referred to further herein as a short-lived raw public key.

Advantages realized by the present use of such short-lived raw public keys include, without limitation: (i) short-lived raw public keys belong to a key hierarchy, thereby enabling the varication thereof using a single trust anchor; (ii) a certificate revocation check is not needed; (iii) the need to operate a CA online is avoided, since the present short-lived raw public keys may be issued by a different end entity (e.g., DSnF 604); and (iv) a short-lived raw public key may be approximately 150 bytes long (e.g., using 256-bit ECDSA), and may readily fit into a single SIB.

Thus, in the exemplary embodiment, a hybrid message protection system includes a public key certificate issued to an entity (e.g., DSnF 604) in the core network, which is then enabled to issue short-lived raw public keys to other entities in the network (e.g., gNBs 104).

Figure 7:
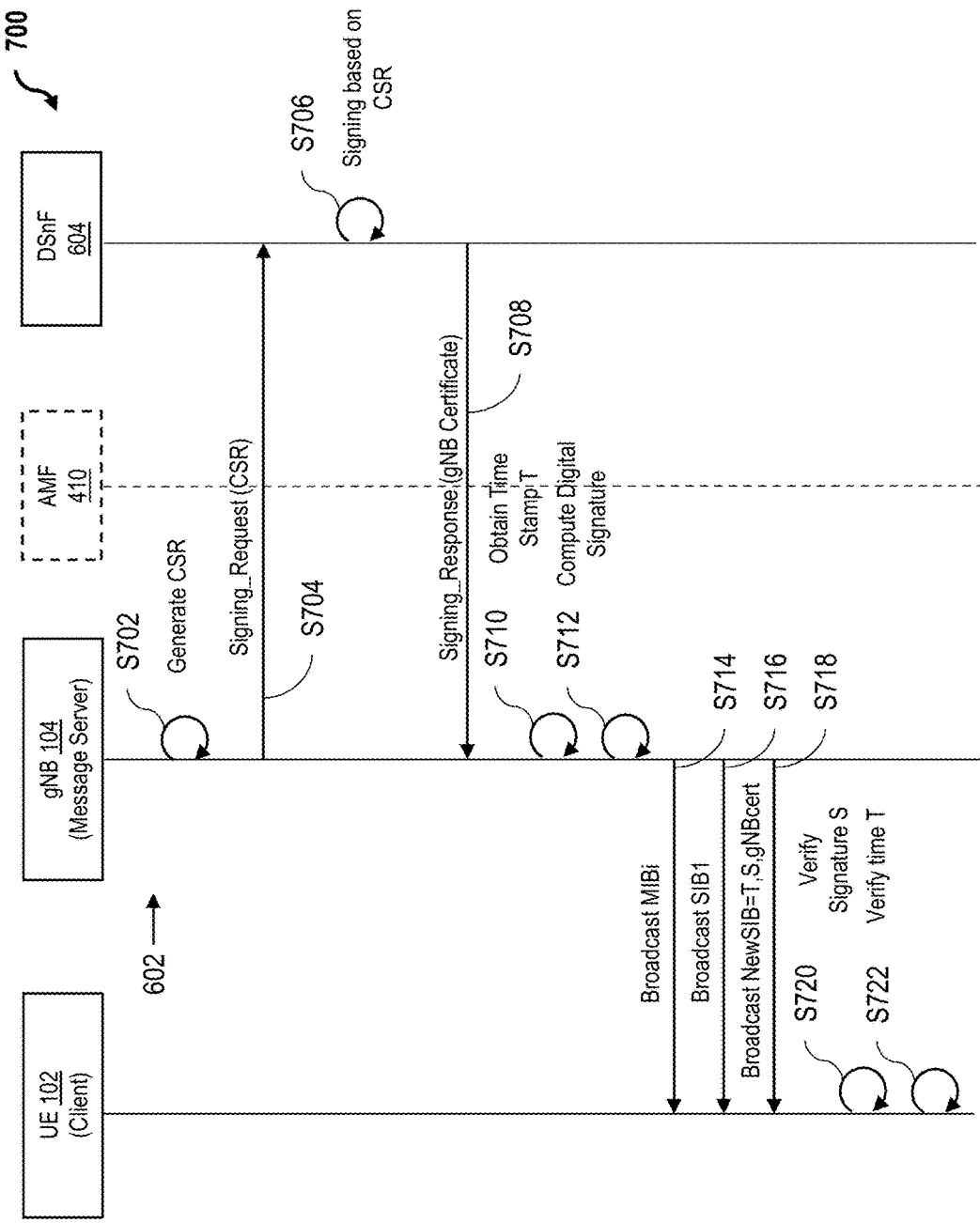
FIG. 7 is a sequence diagram of an alternative message block cryptographic signature process for the mobile network architecture of the communication system depicted in FIG. 1.

FIG. 7 is a sequence diagram of a message block cryptographic signature process 700 for mobile network architecture 602, FIG. 6, of communication system 100, FIG. 1. In process 700 DSnF 604 computes the digital signatures of the system information. In the exemplary embodiment depicted in FIG. 7, process 700 is similar in several respects to process 200, FIG. 2, process 300, FIG. 3, process 400, FIG. 4, and process 600, FIG. 6, and is also implemented with respect to client 102, message server 104, and DSnF 604. In this particular example though, client 102 is depicted as a UE, and message server 104 is depicted as a gNB. Process 700 differs though, from processes 200, 300, 400, and 600 in that process 700 illustrates the exemplary case where digital signature protection is achieved using a digital certificate enabling gNB 104 to create signatures.

In the exemplary embodiment, message block cryptographic signature process 700 begins at step S702, in which gNB 104 generates a public and private key pair and a certificate signing request (CSR). In step S704, gNB 104 transmits a digital signing request, including the CSR, to DSnF 604. In step S706, DSnF 604 signs a certificate based on the CSR, according to one or more of the techniques described above. In an exemplary embodiment of step S706, DSnF 604 signs the certificate after determining that gNB 104 is not compromised.

In step S708, DSnF 604 transmits a signing response to gNB 104, including a gNB certificate. In step S710, gNB 104 obtains time stamp T. Accordingly, in step S712, gNB 104 computes the digital signature S over MIB, SIB1, and timestamp T. In step S714, gNB 104 broadcasts the MIB to be received by UE 102. In step S716, gNB 104 broadcasts the SIB1 to UE 102. In step S718, gNB 104 broadcasts a new SIB, which includes timestamp T, signature S, and the gNB certificate, to UE 102. In step S720, UE 102 verifies the signature S. In step S722, UE 102 verifies the timestamp T.

In the exemplary embodiment, the gNB certificate may be used by gNB 104 to sign both dynamic and static content. In some embodiments, the gNB certificate is short-lived (e.g., 10.24 seconds). In alternative or supplemental embodiments, the gNB certificate may have a short key length to reduce computational overhead. In an exemplary embodiment, one or more of the communication steps between gNB 104 and DSnF 604 may be optionally facilitated through use of an AMF used in mobile network (e.g., AMF 410).

According to the exemplary embodiment depicted in FIG. 7, UE 102 is thus enabled to verify the message integrity, uniqueness, and freshness of both the MIB and SIB1 message blocks of the message in a manner similar to the client-side message verification techniques described above.

The person of ordinary skill in the art though, will comprehend that the principles described herein are not limited to single messages or groups of messages, or to only specific types of communication networks or systems, but are instead broadly applicable to the broadcasting of messages and groups of messages in general, and/or the message block components thereof.

Although some principles of the present delegated digital signing techniques for broadcast messages may appear counter-intuitive at first glance, some security delegation concepts have been previously successfully implemented to resolve particular Internet-centric challenges. For example, many websites use Content Distribution Networks (CDNs) to improve performance and security (e.g., defending against DDoS and web attacks). CDNs require a website to share its TLS certificate and the associated private key with the CDN. This practice has thus become common for many websites, but is considered unacceptable to others having high legal and security requirements (e.g., banks). CDN servers, for example, are distributed on the Internet, and may be located in untrusted locations. There is a high security risk in sharing private keys with such untrusted servers.

To avoid the CDN challenges, some Internet-connected banks have adopted the delegation concept of "Keyless SSL." In Keyless SSL, the private key of a website (e.g., of a bank) is stored in the secure environment (e.g., an HSM) of the website, and never shared with a CDN server. When a CDN server needs to use the private key to process data (e.g., to decrypt keying material) during TLS handshaking with a client (e.g., a browser), the CDN server sends the data (e.g., the encrypted keying material from the client) to the bank website to be processed, then receives only the results (e.g., decrypted keying material) from the bank website, and then continues the TLS handshaking with the client.

Systems and methods according to process 700 thus implement a concept similar, in some respects to Keyless SSL, in that each cell utilizing process 700 will not use a private key for digital signing. Instead, the cell will send the relevant information blocks to DSnF 604 to be digitally signed by DSnF 604. Although this delegated signing technique might theoretically incur some delay from additional intercommunications between entities, any such theoretical delay may be counteracted by pre-signing, and/or signing in batches, the broadcasting information. Additionally, the timing information may also be digitally signed to mitigate anti-replay attacks based on the time of the signing server 604, instead of the time of gNB 104. This approach advantageously removes the need for UEs 102 to synchronize time with all gNBs 104.

In an embodiment of process 700, the digital signatures may be calculated over several information attributes, including without limitation: a PCI; a Primary Synchronization Signal (PSS); a Secondary Synchronization Signal (SSS); an MIB; a first SIB (SIB1); a time counter; and a downlink frequency. Other SIBs may also be signed along with the SIB1, or may be signed individually based on their periodicity.

In an exemplary embodiment of step S704, the signing request enables gNB 104 to request a single digital signature, or a set of multiple digital signatures. To request a set of digital signatures, the request may contain a set of information element groups, each of which may then be digitally signed. Additionally, a set of information element groups may be aggregated to reduce the size of the request.

For example, if all element groups contain the same information elements except Time_Counter, those element groups may be aggregated to, for example, [MIB, SIB1, SIB2, Cell_ID, Downlink_Frequency]| [Starting_Time_Counter, Increment_of_Counter, Number_of_Increments], thereby enabling a cell to use one request to obtain digital signatures for several element groups over a certain period of time (e.g., an hour).

In the exemplary embodiment, the Time_Counter is generated based on the time of DSnF 604. Accordingly, at the first time gNB 104 sends an aggregated digital signing request to DSnF 604, a Starting_Time_Counter is set to a known value (e.g., 0), such that DSnF 604 will generate an initial Time_Counter value based on the local time of DSnF 604. Thus, when gNB 104 sends an aggregated digital signing request for a next period of time, the Starting_Time_Counter may be updated according to the Time_Counter value received in the response for the current period of time (i.e., set to the last Time_Counter in the current period of time).

In an embodiment, MIB and SIB1 are frequently broadcasted (e.g., every 40 ms and 80 ms respectively). Despite this high-frequency broadcasting, the MIB and SIB1 content is expected to remain relatively static. According to this expectation, i.e., that most or all information elements in MIB and SIB1 remain static (except for a very few, such as the SFN), the MIB and SIB1 may be pre-signed in some embodiments. In other embodiments, some fields (e.g., cellBarred) may change frequently, such as during a high load scenario. To accommodate such frequently changing fields, the following three solutions are provided.

In a first solution, if the changing field is of short length (e.g., 1-bit for cellBarred), signatures may be precomputed for all possible values of that field during the window in which the field is expected to change. For example, if a cellBarred flag is expected to change over a certain period of time, signatures may be generated for both cellBarred=0 and cellBarred=1 over that time period. In an exemplary embodiment of this first solution, the signature is paired with its corresponding input value to enable proper selection of that signature for a given input, thereby doubling the number of signatures for the time period. This first solution is of particular value in the case where scalability is not of significant concern, and where multiple fields do not change.

In a second solution, when only a few fields in an SIB are expected to change, new signatures may be requested from DSnF 604, and/or generated by gNB 104. Typically, SIBs are not expected to change often. That is, most SIBs remain unchanged over a period of approximately 3 hours. However, in some special cases, such as under high load, SIBs may change more frequently than usual. Nevertheless, the interval between such changes may typically be considered reasonable to enable UE 102 to be paged to reacquire a new SIB, which in turn is expected to also enable gNB 104 to request new digital signatures from DSnF 604. This second solution is described above with respect to process 600, FIG. 6, and also further below with respect to process 800, FIG. 8.

In a third solution, a temporarily public and private key pair, as well as a short-lived certificate (e.g., valid for an hour) may be issued by DSnF 604 to gNB 104 under circumstances enabling gNB 104 to generate the requisite digital signatures itself. According to this solution, the short-lived certificate may be signed by the digital signing certificate of DSnF 604, and thereby chained to the trust anchor. In conventional techniques, a certificate from the CA is usually required to issue additional certificates; however, according to this third solution, a separate entity (e.g., DSnF 604) is enabled to sign an entity certificate (e.g., the DSnF certificate) as a short-lived certificate. Because the short-lived certificate expires quickly, security risks arising from a compromised private key associated with a short-lived certificate are considered minimal. This third solution is described above with respect to process 700, FIG. 7, and also further below with respect to process 900, FIG. 9.

The present embodiments are still further advantageous over conventional message integrity techniques, in that the techniques described herein may advantageously utilize both symmetric key-based message authentication codes (MACs) and/or asymmetric key-based digital signatures for integrity protection.

Furthermore, short-lived raw public keys are available to provide the system 100 with methods for reducing the processing power and battery life required of the UE 102 while selecting the gNB 104 to connect to. With an entity certificate configured as the trust anchor, the digital signature (along with some other data, e.g., a timestamp) of System Information (SI) and a short-lived raw public key need to be delivered to UEs for them to verify the SI.

The short-lived raw public key acts as temporary credentials to allow the system 100 to more quickly sign messages and for the UE 102 to validate the signature more quickly. The short-lived raw public key is configured to only last for a specific period of time. In at least one embodiment, the length of the specific period of time is based on the length of the key and the amount of time that it would take to decipher the key.

In at least one embodiment, the short-lived raw public key is designed to be valid and used for a specific period of time. In some embodiments, the short-lived raw public key is provided by the DSnF 604 in step S708 along with an associated certificate. The certificate is a short-term certificate which the gNB 104 uses to computer the digital signatures shown in step S712. The short-term digital certificate and the short-term raw key are provided to the UE 102 to allow the US 102 to verify the signature, shown in step S720.

At least one of the short-term digital certificate and the short-term raw key include at least an expiration field. In other embodiments, they include a not valid before field and a not valid after field. The short-term key has fewer bits than usually to be less computationally intensive. The shorter the length of the key, the less secure the key is; therefore, the short-term key has a shorter lifetime as well to prevent hacking. Normal certificates can have a duration of any length, but some systems restrict them to being no longer than 364 days. In some embodiments, the short-term certificate's duration ranges from a few seconds to up to a year. In the exemplary embodiment, the short-term certificate's duration is a week. Furthermore, by having an expiration field where the time until the expiration is short, the digital certificate do not require revocation checks, further reducing the computational and bandwidth load on the gNBs 104 and the UEs 102.

In the exemplary embodiment, the gNB 104 can request from the DSnF 604 a certificate lasting any specific period of time. This may be tied to how long the gNB 104 will be alive. In some further embodiments, the duration of the certificate is based on one or more policies, such as the policy for the gNB 104 and the policy for the DSnF 604. For example, if the gNB 104 has a policy that allows for certificates to last a maximum of one month and the DSnF 604 has a policy that only allows certificates to last a maximum of two weeks, then the maximum duration certificate that that DSnF 604 can provide is two weeks. The DSnF 604 and/or the gNB 104 calculates the length of the key associated with the certificate based on the lifetime for that key. The shorter the lifetime, the fewer bits are required for the key. Furthermore, the length of the key may also be based on the security of the location. For example, the length of a key required in the lobby of a doctor's office would be shorter than the length of the key in the lobby of a government building.

In the exemplary embodiment, the gNB 104 only uses the short-term key for the broadcast messages, such as those shown in FIG. 7. Other messages would use other keys. The shorter key means that less computational power is required for the gNB 104 to generate the signatures and less computational power is required for the UE 102 to validate the signatures. For the UE 102, less computational power means less battery life used. Furthermore, requiring less computational power allows for less expensive and faster gNBs 104.

There are multiple different options for delivering a digital signature and a short-lived raw public key. First, both the digital signature (e.g., of 64 bytes) and the short-lived raw public key (e.g., about 150 bytes) are included in a SIB. Although the combined size is about 214 bytes, which can fit into SIB (up to 372 bytes), it would reduce the capacity of the SIB by more than half (e.g., to about 160 bytes). Further, while a signature is based the content of a particular SIB, the short-lived raw public key might be valid for many instances of different SIBs.

Second, a new SIB (namely SIB_x) is defined to carry both the digital signature and the short-lived raw public key. This option has the advantage of leaving other SIBs untouched. However, it may create new problem in the scheduling of the new SIB_x. Since the digital signature is computed based on the content of a particular SIB, the new SIB_x carrying the digital signature may need to be scheduled precisely according to the schedule of existing SIBs to ensure that the SIBs and the digital signature acquired in two separate messages match each other. This is of particular challenge for SIB1, since it is repeated several times within a periodicity of 160 ms. Although the repeated SIB1 may not change in content, timing related attribute associated with a repeated SIB1 may change. Thus, separating the digital signature from SIB1 would require precise scheduling of the new SIB_x.

Third, the short-lived raw public key is carried in a new SIB, but the digital signature of SIB is carried within the SIB. This option adds reasonable amount of message overheads to a SIB, but avoids the complexity of scheduling the new SIB_x.

There are advantages and disadvantages to each option, which may be selected based on the network configuration and desired performance.

Furthermore, to reduce the computational overhead of preparing short-lived public keys, if the DSnF 604 knows that the gNB 104 needs a new key every new period of time, the DSnF 604 can prepare the keys and the certificates ahead of time. These keys and certificates would then include a not valid before and a not valid after time to allow the gNB 104 to determine when they can be used.

In some embodiments, the DSnF 604 transmits the key certificate, the public key, and potentially the private key. In these embodiments, the DSnF 604 generates the public and private key pair and the key is then signed by the DSnF 604, to show that the key comes from a trusted entity. The DSnF 604 also signs the certificate. In some of these embodiments, the gNB 104 uses the private key to sign its messages. In some other embodiments, the gNB 104 generates the key pair in step S702 and transmits the keys to the DSnF 604 for use in signing the certificate. In still further embodiments, process 700 begins with step S706, where the DSnF 604 signs the digital certificate and then in step S708 transmits the digital certificate and the private key to the gNB 104. In the exemplary embodiment, the DSnF 604 has a long-term certificate sourced from a certificate authority 108 (shown in FIG. 1).

Figure 8:
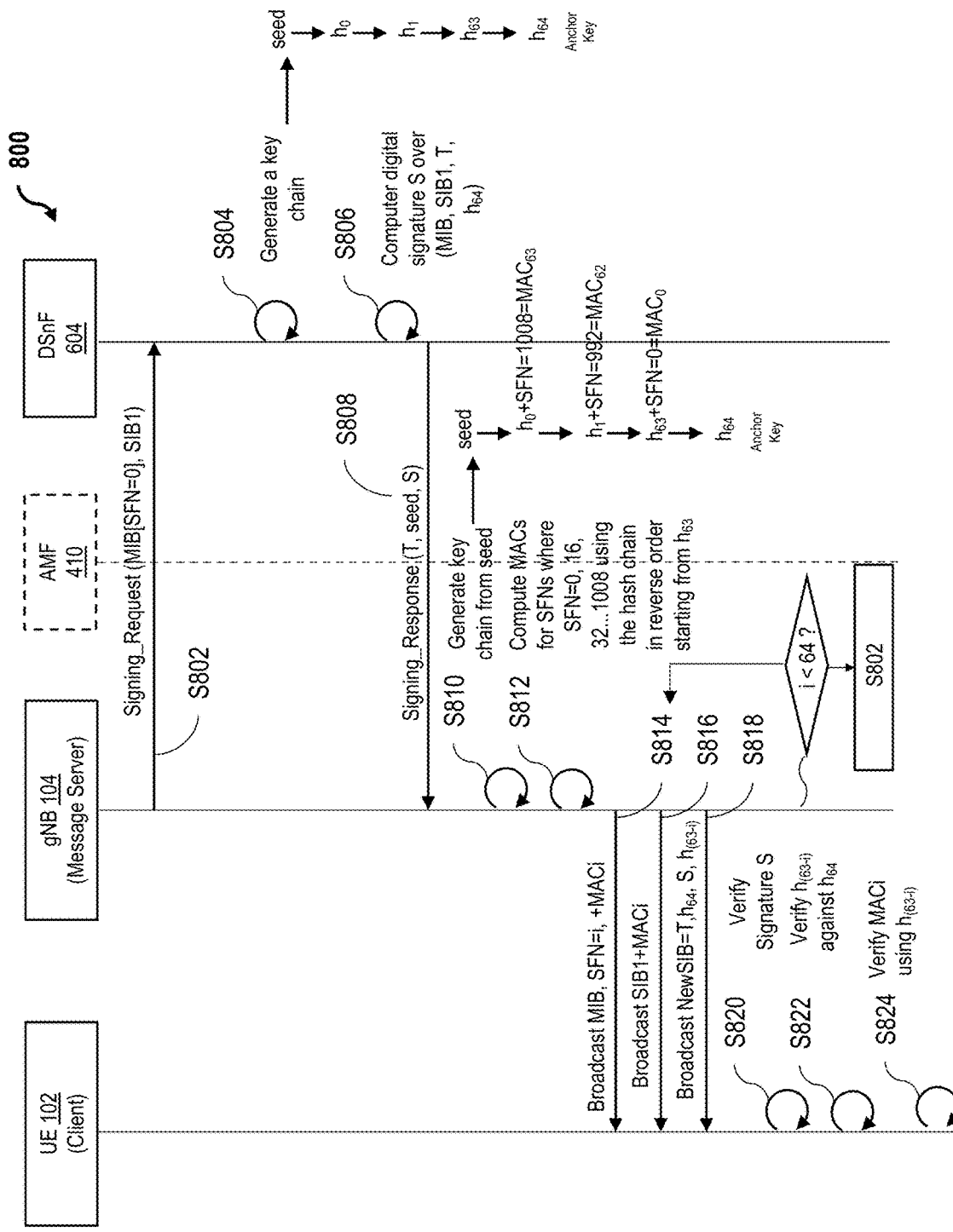
FIG. 8 is a sequence diagram of an alternative message block cryptographic signature process for the mobile network architecture of the communication system depicted in FIG. 1.

FIG. 8 is a sequence diagram of an alternative message block cryptographic signature process 800 for mobile network architecture 602, FIG. 6, of communication system 100, FIG. 1. Process 800 is similar in several respects to message block cryptographic signature process 600, FIG. 6, and is also implemented with respect to client 102, message server 104, and DSnF 604. Process 800 differs from process 600 though, in that process 800 depicts an implementation of an exemplary case where a key chain is implemented with the digital signature protection sought via the digital certificate provided by DSnF 604. In the exemplary embodiment illustrated in FIG. 8, client 102 is again depicted, for ease of explanation and not in a limiting sense, as a UE, and message server 104 as a gNB.

According to innovative process 800, the MIB and the SIB1 may be digitally signed by DSnF 604, and a unique hash chain may be generated by DSnF 604 for use by gNB 104 to sign dynamic fields (e.g., SFN). According to process 800, the MIB may be advantageously extended to include some bits of a MAC, if not a complete MAC due to size constrains, and the SIB1 may be extended to include the complete MAC. When the MAC is included in the MIB or the SIB1, the corresponding hash key used to generate the MAC may be disclosed in a new SIB that is broadcasted after SIB1. In this manner, UE 102 is enabled to verify both the static and the dynamic fields after acquiring the new SIB.

In the exemplary embodiment depicted in FIG. 8, message block cryptographic signature process 800 begins at step S802, in which gNB 104 transmits a digital signing request to DSnF 604. In an exemplary embodiment of step S802, the digital signing request includes the MIB (e.g., with the SFN set to zero) and the SIB1. In step S804, DSnF 604 generates the key chain. In an exemplary embodiment of step S804, the key chain starts with a seed, which then further chains 64 iterations $h_0$ through to $h_{64}$, with iteration $h_{64}$ being the anchor key. In step S806, the DSnF 604 computes a digital signature S over the MIB, SIB1, timestamp T, and $h_{64}$. In step S808, DSnF 604 transmits the signing response back to gNB 104. In an exemplary embodiment of step S808, the signing response includes the timestamp T, the seed, and the signature S.

In step S810, gNB 104 recreates the key chain from the seed. In step S812, gNB 104 computes MACs for different SFNs, where the SFN-0, 16, 32, . . . 1008 using the hash chain in reverse order starting from $h_{63}$. In step S814, gNB 104 broadcasts the MIB to UE 102, where SFN=i. In an exemplary embodiment of step S814, gNB 104 additionally includes the MACi or a subset of the MACi. In step S816, gNB 104 broadcasts the SIB1+$MAC_i$ to UE 102. In step S818, gNB 104 broadcasts a new SIB to UE 102, which includes timestamp T, $h_{64}$, signature S, and $h_{(63-i)}$. In an exemplary embodiment of step S818, gNB 104 determines if the particular iteration i is equal to 64. If the iteration i is not equal to 64, gNB 104 increments i by 1, and then returns to step S814. In this manner, gNB 104 will loop through steps S814-S818 64 times from the first iteration, and for each iteration, gNB 104 will perform each of step S814-S818. If though, upon completion of step S818, the iteration i is equal to 64, gNB 104 returns to step S802.

Accordingly, UE 102 acquires the MIB+$MAC_i$, the SIB1+$MAC_i$, and the new SIB from the respective broadcasts from gNB 104. In step S820, UE 102 verifies the signature S from the received broadcasts. In step S822, UE 102 verifies $h_{(63-i)}$ against $h_{64}$ (the anchor key). In step S824, UE 102 verifies the MACi using $h_{(63-i)}$. Thus, upon acquisition of the new SIB, UE 102 is advantageously enabled to verify both the static and the dynamic fields of the information elements.

Figure 9:
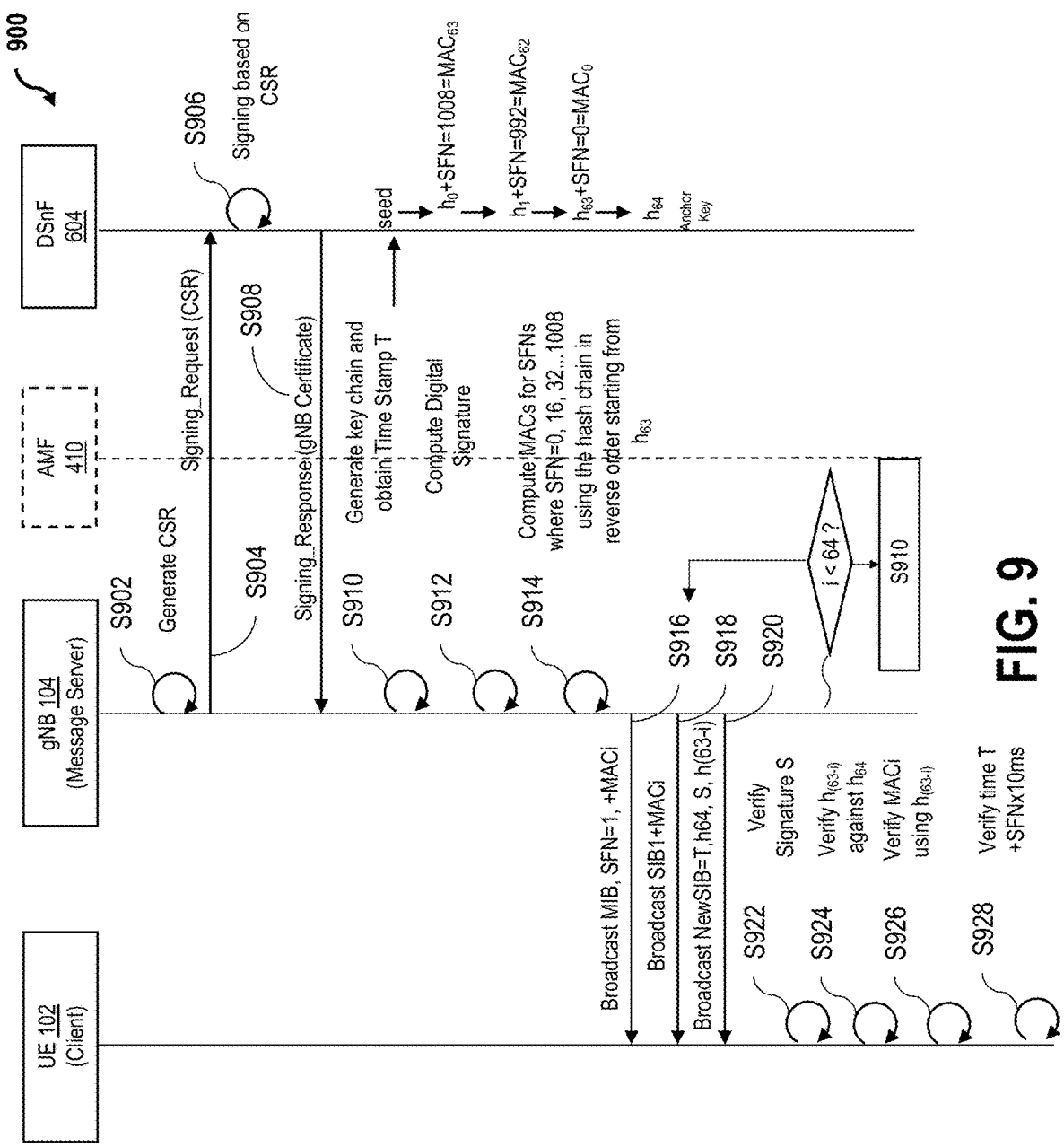
FIG. 9 is a sequence diagram of an alternative message block cryptographic signature process for the mobile network architecture of the communication system depicted in FIG. 1.

FIG. 9 is a sequence diagram of an alternative message block cryptographic signature process 900 for mobile network architecture 602, FIG. 6, of communication system 100, FIG. 1. Process 900 is similar in several respects to message block cryptographic signature process 700, FIG. 7, and is also implemented with respect to client 102, message server 104, and DSnF 604. Process 900 differs from process 700 though, in that process 900 depicts an implementation an of exemplary case where a key chain is implemented with the digital signature protection sought via the digital certificate provided by DSnF 604, thereby enabling gNB 104 to create signatures, and DSnF 604 computes the digital signatures of the system information. In the exemplary embodiment illustrated in FIG. 9, client 102 is again depicted, for ease of explanation and not in a limiting sense, as a UE, and message server 104 as a gNB.

According to innovative process 900, the MIB and the SIB1 may be digitally signed by DSnF 604, and the digital sent to gNB 104 enables gNB 104 to itself generate a unique hash chain to sign dynamic fields (e.g., SFN). In the exemplary embodiment depicted in FIG. 9, process 900 thus illustrates how a certificate issued to gNB 104 by DSnF 604 may be used to digitally sign static content in the MIB and the SIB1, and also that a key chain may be generated by gNB 104 to sign the dynamic fields (e.g., SFN). Since only the static content is digitally signed by DSnF 604, thereby enabling gNB to sign the dynamic content, both the key length and the lifetime of the gNB 104 certificate may be longer, which helps to reduces network bandwidth overhead in both gNB 104 and DSnF 604.

In the exemplary embodiment, message block cryptographic signature process 900 begins at step S902, in which gNB 104 generates a public and private key pair and a certificate signing request (CSR). In step S904, gNB 104 transmits a digital signing request, including the CSR, to DSnF 604 for signing a certificate based on the CSR. In step S906, assuming that gNB 104 is determined to not be compromised, DSnF 604 signs the certificate based on the CSR.

In step S908, DSnF 604 transmits a signing response to gNB 104, which may include a gNB certificate. In step S910, gNB 104 obtains the time stamp T and generates a gNB key chain. Similar to the DSnF key chain described above with respect to FIG. 8, the gNB key chain starts with a seed, and then includes 64 iterations $h_0$ through to $h_{64}$, with $h_{64}$ again being the anchor key. In step S912, gNB 104 computes a digital signature S over the MIB, SIB1, T, and $h_{64}$. In step S914, gNB 104 computes MACs for SFNs (e.g., SFN-0, 16, 32, . . . , 1008) using the hash chain in reverse starting from $h_{63}$.

In step S916, gNB 104 broadcasts the MIB, where SFN=i, and may additionally include the $MAC_i$ or a subset of the $MAC_i$. In step S918, gNB 104 broadcasts the SIB1+$MAC_i$. In step S920, gNB 104 broadcasts a newSIB, which includes timestamp T, $h_{64}$, signature S, $h_{(63-i)}$. If, upon completion of step S920, the iteration i is not equal to 64, gNB 104 increments i by 1, and then returns to step S916. If, however, iteration i is equal to 64, gNB 104 returns to step S910. In this manner, gNB 104 loops 64 times through steps S916-S920, similar to the analogous steps of process 800, FIG. 8. That is, for each iteration, gNB 104 performs each of steps S916-S920.

From the respective broadcast of the iteration steps S916-S920, UE 102 thus acquires the MIB+$MAC_i$, the SIB1+$MAC_i$, and the newSIB from gNB 104. In step S922, UE 102 verifies the signature S. In step S924, UE 102 verifies $h_{(63-i)}$ against $h_{64}$. In step S926, UE 102 verifies the MACi using $h_{(63-i)}$. In step S928, UE 102 verifies the time T+SNF times 10 ms.

Thus, according to process 900, the gNB certificate may be used by gNB 104 to sign both dynamic and static content. In some embodiments, the gNB certificate is short-lived (e.g., 10.24 seconds). In alternative or supplemental embodiments, the gNB certificate may have a short key length to reduce computational overhead.

UE Behavior

Based on the descriptions above, there may be two types of UEs 102 based on whether or not the UE supports digital signature verification. If a UE 102 does not support digital signature verification, its behavior in cell scanning and cell selection remain unchanged. If a UE 102 supports digital signature verification, its behavior in cell scanning and cell selection may be modified to take into consideration the results from signature verification.

In the exemplary embodiment, UE 102 is provisioned with a list of trust anchors, and UE 102 may be configured to support secure storage of these trusted anchors. UE 102 may thus consider the results from signature and freshness verification of SI for cell selection and reselection. Upon detection of an invalid signature, UE 102 may determine that the cell is not to be selected, as described further below. In an exemplary embodiment, the trust anchors are provisioned into UE 102 during manufacture, onboarding, or after registration.

Trust Anchors for UEs

To verify the digital signatures received directly from message servers (e.g., gNBs 104), the client-side receiving device (e.g., UE 102) is preconfigured with a list of trust anchors in the exemplary embodiment. For ease of explanation, but not in a limiting sense, the following embodiments are described with respect to exemplary embodiments of gNB 104 as the message server, and UE 102 as the receiving device.

Accordingly, in an embodiment, to support roaming, the trust anchor of each roaming partner network is preconfigured in the UE. These trust anchors may be raw public keys, or public key certificates. If the trust anchor is a raw public key, one trust anchor may be required for each roaming partner (i.e., unless a key is shared among multiple roaming partners, such as those under the control of a common operator).

If the trust anchor is a public key certificate, the number of trust anchors in the UE may be significantly reduced if common CAs (e.g., CA 108, FIG. 1) are used among operators.

In an exemplary embodiment, there are four potential models that may be used for establishing CAs 108 to support the signing of SIB messages.

In the first model, a common root CA 108 is established among global mobile industry to issue intermediate CA certificates or signing certificates to each mobile operator. GSMA, for example, may be suitable for hosting such root CAs 108. This model is adopted by the cable industry.

In the second model, regional root CAs 108 are established to serve mobile operators within specific respective regions. This model is adopted by Internet Registries (RIR) to support Resource PKI (RPKI) for validating IP prefix origin in the Border Gateway Protocol (BGP), with each of the five Regional Internet Registries (RIR) hosting its own root CA 108.

In the third model, one or several security companies may be selected by the mobile industry as the trusted third party to issue intermediate CAs 108 or signing certificates to mobile operators. Since mobile operators have been partnering with SIM card vendors for a long time, SIM card vendors may be suitable for hosting such root CAs 108. This model is adopted by the Wi-Fi Alliance (WFA).

In the fourth model, each mobile operator establishes or leverages its current CAs 108 to issue signing certificates. Many mobile operators already have internal CAs 108 for other purposes, which may be leveraged to sign system information.

The total number of trust anchors resulting from the selected CA model, however, should be analyzed for scalability with respect to each CA model.

In the first model, for example, there is a common root CA 108 for all operators; thus, only one trust anchor is required.

In the second model, regional root CAs 108 are used by the operators for each region thereof; thus, the number of trust anchors depends on the number of regions involved. For example, RPKI includes five regions, thereby resulting in five trust anchors. If each country is considered a region and share a common CA 108, there would be approximately 180 trust anchors.

In the third model, public CAs 108 are leveraged to issue public certificates for operators; thus, the number of trust anchors depends on the number of public CAs 108 that are chosen by mobile industry for this service, which could be in the range of a few to tens.

In the fourth model, each operator establishes its root CA 108 without depending on any third party; thus, the number of trust anchors depends on the number of roaming partners chosen by an operator, which is usually around 300. In an unlikely case that a mobile operator chooses every mobile operator in the world as its roaming partner, the number of trust anchors would be about 1250, according to GSMA.

According to these four models, only one single trusted anchor is needed in the most efficient scenario (i.e., model 1), whereas there will be about 300 to 1250 trust anchors in the least efficient scenario (i.e., model 4).

In some embodiments, these four models are not mutually exclusive, and may also be adopted in a hybrid manner, based on the preference of each operator. Thus, in some embodiments a realistic number of trust anchors will be fewer than three hundred. The end result is a list of CA certificates, which may be exchanged among roaming partners or via a trusted third party (e.g., GSMA). GSMA, for example, provides a Network Settings Exchange program, which may be leveraged to maintain the list of trusted CA certificates.

In an embodiment, the list of CA certificates is provisioned into UEs 102 as trusted anchors to allow UEs 102 to verify signatures carried in the SIB messages. Each CA certificate, if it is an X.509v3 certificate, would typically include about 700 bytes. Thus, the total storage needed to store all trust anchors in the least efficient scenario is about 1 Mbytes.

Since such a list would be public information available to both operators and vendors, the list may further be provisioned into UEs 102 during manufacturing (e.g., by USIM vendor, chip vendor, or UE vendor). Trust anchors may also be provisioned during UE 102 onboarding, and then updated after registration or through over-the-air updates by an operator. This flexible pre-provisioning and dynamic updating functionality enables a simplified deployment and trust anchor updates when the home operator or any of its roaming partners changes its trust anchor.

An operator may create its own raw key pairs as the trust anchors, e.g., by reusing the process of generating and provisioning of the key pair for SUPI protection. It is notable here that that the key pair of this use case is implemented for digital signing, whereas in the SUPI protection case, the key pair is implemented for key encryption. Thus, although the present embodiments may follow a key generation and provisioning process similar to SUPI protection, the present embodiments utilize the generated/provisioned keys in a significantly different manner.

In an embodiment, the trust anchors and DSnF certificates each include a scope (e.g., PLMNs, physical areas, etc.). In an exemplary embodiment, the scope of the DSnF certificate is within the scope of the issuing trust anchor. According to this example, when UE 102 receives a signed broadcasted SI, UE 102 is enabled to verify not only the signature of the signed SI, but also the certificate chain from the signing certificate (e.g., DSnF certificate) toward a trust anchor, including verification of the scope within each certificate on the chain. In some embodiments, specific parameters of the certificate scope may be specified during normative phase.

For instance, a given UE 102 might contain a trust anchor associated to an NPN located in a very specific area. In this instance, the private key associated with the DSnF certificate issued by this NPN trust anchor may be checked to ensure that it is not misused to sign SI outside the scope of the NPN designated area.

In some embodiments, UE 102 scans all supported bands and frequencies for available cells. UE 102 then may store the PCI computed based on the PSS and the SSS of each scanned cell. UE 102 may then compare a new scanned PCI with existing stored PCIs to detect and/or determine potential conflicts. If there is a conflict, UE 102 may obtain a direct time indication from DSnF 604 (as described below), and use this obtained time indication to verify the consistency of received time counters (as also described below).

UE 102, if configured with a setting to verify the authenticity of system information, is thus enabled to acquire the SIB carrying the digital signatures. UE 102 may then use this acquired SIB to determine which other SIBs are digitally signed. With this information, UE 102 may compute a hash over the protected system information along with supplemental information elements in the acquired SIB. UE 102 may then use a key identifier to retrieve the public key corresponding to the signing private key. Using this computed hash and the public key, a digital signature may be verified accordingly, depending on the digital signing algorithm being used.

To mitigate replay attacks, as described above, the freshness of the message is verified in the exemplary embodiment. Such freshness verification may be achieved, for example, by comparing the timer counter in the received message against the UE local time. If the resulting time difference is within a tolerance window, the message may be considered fresh. Otherwise, the message is considered expired.

Although this freshness verification technique appears relatively simple, its implementation may nevertheless result in denial-of-service (DoS) if the UE time is manipulated (e.g., clock is set to a future time). As described with respect to the several embodiments above though, time variants (e.g., time counters) in the signed messages are generated by DSnF 604, as opposed to gNBs 104, and therefore may be trusted to be accurate.

If a newly received time counter fails verification, either the message is replayed, or the UE time is considered inaccurate (e.g., manipulated). To mitigate the potential time attacks against UE 102, time counters received from multiple cells and/or gNBs 104 may also be checked. More specifically, when the digital signature from each cell and/or gNB 104 is deemed valid, but the Time Counters recently received from the multiple cells and/or gNBs 104 fail verification, UE 102 may check the consistency of the Time Counters from those multiple cells. If the checked Time Counters are reasonably close to one another, it may be determined that there is an indication that the UE time is out of sync with the network. If the checked Time Counters are inconsistent with one another, however, an indication may be determined that an attacker is present (e.g., by replaying old information). In either case, UE 102 may select the cell with the highest time counter, since a replayed time counter is highly unlikely to represent the latest time.

In some embodiments, the UE's time is incorrect because the UE 102 has been off for a significant period of time or the UE has travelled into a new time zone while in a no communication mode, such as airplane mode. In these embodiments, the UE attempts to verify the timestamp using an old or not synchronized time. If the UE time and the times received from cells of the network are in conflict, the UE 102 compares the different times from multiple cells. If two cells are consistent with their timestamps, then the UE 102 assumes the cell timestamp is correct and uses the cell timestamp when connecting to the network. If the two cells are inconsistent, then the UE 102 polls additional cells in attempt to get a consistent time from a majority of the cells. In some embodiments, the UE 102 scans until if finds a percentage of cells that are consistent, where the percentage is above a threshold. Then the UE 102 would use that timestamp to connect to the cell with the highest priority with that consistent timestamp.

Additionally, by checking the consistency of time counters received from multiple cells, the present systems and methods may advantageously avoid the need to check the time counter against the UE local time, which may eliminate the need of time synchronization among all UEs 102 and the network. Furthermore, once the UE 102 is connected to the network, the UE 102 can synchronize with the network time through normal mechanisms, such as the network time protocol (NTP).

It may be particularly beneficial for UE 102 to obtain a direct time indication from DSnF 604 in exemplary instances, including without limitation, where UE 102: (1) has access to too few base stations (e.g., only to a single base station); (2) detects multiple cells within the same PCI; (3) observes time values broadcasted by multiple base stations, but such time values are not close to each other; (4) observes time values broadcasted by multiple base stations, where such values are close to each other, but the associated freshness checks fail; (5) requires a high security level and requires a 100% trusted time source; (6) is starting up for the first time; and (7) requires learning the DSnF time very quickly, i.e., without scanning all frequencies.

In the exemplary instance described immediately above, UE 102 may perform the following process, at least at a high level: (a) UE 102 scans looking for cells; (b) as soon as UE 102 detects a base station with a high enough received signal strength, UE 102 acquires MIBs and SIBs and checks the signature; (c) if the signature is valid, UE 102 may initiate a subprocess or trigger a protocol. This subprocess/protocol may include without limitation, at a high level, the following substeps: (i) UE 102 computes a nonce, e.g., a randomly generated 128-bit long number; (ii) UE 102 transmits the nonce to DSnF 604 as part of a request message to DSnF 604 for a reference time; (iii) at the time of sending, UE 102 starts a timer (denoted UE timer); (iv) DSnF 604 signs the received nonce and the current DSnF time (e.g., Signed_DSnF_time), and possibly other information such as any known processing time at DSnF 604 (e.g., time required to compute the digital signature); (v) DSnF 604 transmits the signed information back to UE 102 (e.g., existing protocols, such as NTP, may be used for requesting and receiving a signed reference time from DSnF 604 in some embodiments); (vi) UE 102 stops the UE timer upon reception of the message; (vii) UE 102 checks the validity of the signature and the presence of the nonce included in the first message; (viii) if both checks are correct, and the UE timer does not reach a maximum time threshold (e.g., 40 ms), the UE 102 uses the received reference time for further processing (described further below); (ix) if the protocol does not return a reference time, e.g., because no reply is received, UE 102 may then perform additional actions. Such actions may include causing UE 102 to retry the request a number of times. If no return message is received, the communication with the base station may be aborted.

In an exemplary embodiment, the subprocess/protocol described above may be triggered as soon as it is feasible to do so, and before any information related to UE 102 is disclosed. DoS countermeasures may then be incorporated to prevent an attacker from misusing this subprocess/protocol to perform DoS attacks, and particularly such attacks against DSnF 604.

Cell Selection and Reselection

In some embodiments, cell selection and reselection are based on signal strength, i.e., the cell with the strongest signal gets selected. To prevent false base stations from being selected, cell selection and reselection according to the present embodiments takes into consideration additional information, such as, but not limited to, the authenticity and freshness of system information.

In at least one embodiment, UE 102 scans the cells in all supported frequencies, records their PCIs, and measures their signal strengths. In the case of UE 102 detecting cells with conflicting PCIs, UE 102 may temporarily exclude these cells from the selection process, and instead obtain a reference time indication directly from DSnF 604. This DSnF reference time indication may then be used by UE 102 to verify the consistency of received time counters.

In at least one example, there are N cells with good signals, which are ordered based on signal strength. For each of the N cells, UE 102 acquires MIB and SIBs. If there is no digital signature, UE 102 marks the cell as unprotected. If there is digital signature, UE 102 verifies the digital signature and time counter. If either of the digital signature or time counter is bad, UE 102 marks the signature as bad and stores the time counter. UE 102 then proceeds to the next cell. If both of the digital signature and time counter are good for the next cell, UE 102 may then select this next cell, or may proceed to check another cell thereafter. At the end of this process, the UE 102 is thus enabled to select an authentic cell, that is, if any such cells are available.

However, in the case where no cell has been selected according to exemplary process described immediately above, UE 102 may further analyze the cells. For example, in the case where some of the digital signatures are good, but their associated time counters are bad, UE 102 may further scan for duplicate PCIs. If no duplicate PCIs are detected, UE 102 selects the cell with a good digital signature and the highest time counter. For situations where all of the digital signatures are bad, UE 102 may opt to select none of the cells, because of an indication that the time counters thereof may have been forged. In situations where cells have conflicting PCIs, UE 102 may temporarily exclude those cells, and then further analyze the digital signatures of these excluded cells for validity. If the analyzed digital signature(s) is(are) valid, UE 102 may keep the cell with the most recent system information/time and a valid digital signature, and exclude those with older system information/time. If all of the remaining cells have the same PCI and the same time counter, UE 102 may ignore those cells.

In the case where UE 102 has not selected a cell at this point, then all cells supporting digital signatures may be deemed to have failed the signature validation, or have conflicting PCIs and the same time counter. Three types of cells fall within these categories, namely: (1) cells supporting digital signing, but with bad signatures; (2) cells that do not support digital signing (i.e., no signatures); and (3) cells that cannot be trusted because they have conflicting PCIs and the same time counter. The latter case category is a likely result from tampering of the message by an attacker. From the security perspective, UE 102 may be further configured to go temporarily out of service instead of risking the selection a faked cell. Such an approach follows the security principle of "failing securely," namely, the integrity of the system will remain even in the case where availability to the device is lost. This principle is widely adopted in system security designs configured to abort or reboot upon the detection of an attack.

With the MIB/SIB1 digitally signed, the present cell selection and reselection techniques may further take into consideration not only signal strength, but also the authenticity and freshness of the MIB/SIB1. As shown below in Table 2, ten possible scenarios are shown, which are based on the combinations of the states of digital signature, trust anchor, timestamp, and PCI uniqueness, among the several parameters. The first case (Case A) is considered the "normal" case, in which the digital signature of MIB/SIB1 is valid, the public key used to verify the digital signature is trusted (i.e., signed by a provisioned trusted anchor), the timestamp is fresh, and there is no PCI conflict. In this case, the cell may be immediately selected if the signal strength meets the criteria.

In all other cases (B-J), some non-normal issue exists with at least one of the parameters. Therefore, in any of Cases B-J, the cell cannot be immediately selected, nor fully rejected. That is, if UE 102 immediately selects a problematic cell, security could be compromised, whereas if UE 102 fully rejects that problematic cell, a UE service degradation or outage may result.

Therefore, in an exemplary embodiment, UE 102 prioritizes cells for selection and reselection based on the results of MIB/SIB1 verification. Table 2 thus illustrates an exemplary priority ordering for each of the 10 cases shown. In this example, the first case (Case A) is given the priority of 1.1, that is, the highest priority. Case B is of priority 1.2, the second highest, since it is likely in this case that the UE clock is out of sync with the network, requiring a consistency check with additional cells. Cases C and D are ordered next, because these cases indicate the likelihood that UE 102 has left its home network and entered the network of a roaming partner. The rest of Cases E-J, however, indicate the likelihood of results caused by an attacker. It should be noted that lowest priority case (Case J) indicates the likelihood of a legitimate base station that does not implement digital signing. However, in this exemplary priority scheme, Case J is not given a higher priority to avoid the risk that a man-in-the-middle (MitM) attacker could strip the digital signature from SIB1 (and/or other related fields) to pretend that a cell has not implemented the feature.

marks the cell as unprotected. If there is a digital signature, the UE 102 verifies the digital signature and time counter. If both the digital signature and the time counter of the cell are

TABLE 2

| Case | Priority in cell selection | Is digital signature valid? | Is digital signature trusted | Is timestamp fresh? | Is PCI unique? | Notes |
|------|----------------------------|-----------------------------|------------------------------|---------------------|----------------|-------|
| A | 1.1 | Yes | Yes | Yes | Yes | Normal case |
| B | 1.2 | Yes | Yes | No | Yes | UE clock is out of sync with the network, or replayed MIB/SIB1 |
| C | 2.1 | Yes | No | Yes | Yes | Trust anchor has not been provisioned (e.g., first time in a roaming network) |
| D | 2.2 | Yes | No | No | Yes | Trust anchor has not been provisioned, and UE clock is out of sync with the network or replayed MIB/SIB1. |
| E | 3.1 | Yes | Yes | Yes | No | Replayed MIB/SIB1 |
| F | 3.1 | Yes | Yes | No | No | Replayed MIB/SIB1 |
| G | 3.1 | Yes | No | Yes | No | Replayed MIB/SIB1, no trust anchor |
| H | 3.1 | Yes | No | No | No | Replayed MIB/SIB1, no trust anchor |
| I | 3.2 | No | Not relevant | Not relevant | Not relevant | MIB/SIB1 has been tampered with, e.g., using bit-flipping attack. Other parameters become irrelevant since they may be forged. |
| J | 3.2 | Without signature | Not relevant | Not relevant | Not relevant | Signature may have been stripped, or digital signing has not been implemented (e.g., eNodeB) |

According to Table 2, if all available cells have a priority of 3.x, UE 102 may decide how to proceed based on local policy. For example, the strictest security policy might force UE 102 to go out of service temporarily, since an invalid digital signature or the absence of a digital signature does not provide a guarantee that the cell is authentic. In contrast, a more moderate security policy might allow UE 102 to randomly select one of the cells to continue the service, and then only log and report the event. Although this more moderate security policy presents a security risk, the policy may nevertheless force an attacker to have to interfere with and jam all other cells in order to force this scenario, which significantly raises the bar for a successful attack.

In the exemplary embodiment, the UE 102 determines which cell to use based on comparing the priorities of the cells and any stored policy that the UE 102 has. In some secure embodiments, the UE 102 does not connect unless the priority is 1.x. In other embodiments, the UE 102 will only connect to cells with priority of 1.x or 2.x In still further embodiments, the UE 102 will connect to any cell it can find, but will take into account the priority of the connected cell in providing extra security to the connection.

In other embodiments, the UE 102 performing cell selection and reselection scans the cells in all supported frequencies, records their PCIs, and measures their signal strengths. Cells with conflicting PCIs are temporarily excluded from the selection process. Assuming N cells with good signal strengths and non-conflicting PCIs, the UE 102 ranks the cells based on signal strength.

For each of the N cells the UE 102 performs a loop process, first the UE 102 acquires the MIB and SIBs of the next cell in order. If there is no digital signature, the UE 102 good, then the US 102 selects that cell to connect with, exits the loop, and proceeds to cell connection. If either the signature or the time counter are bad, the UE 102 marks the digital signature as bad and stores the time counter. The UE 102 then loops back and proceeds to the next cell. The UE 102 loops through this process until the UE 102 selects a cell or all N cells have been analyzed.

If no cell has been selected, then it could be one of these scenarios: A) some digital signatures are good, but their associated time counters are bad or B) all digital signatures are bad. In scenario A, the UE 102 will select the cell with a good digital signature and the highest time counter. In scenario B, the time counters would become irrelevant, since they can be forged. At this point, if no cell has been selected, then all cells that support digital signing have failed signature verification. The remaining cells are A) cells supporting digital signing but with bad signatures and B) cells not supporting digital signing at all, aka no signatures. In some situations, the UE 102 includes those previously excluded cells with conflicting PCIs and runs through the loop for the conflicting PCI cells.

If no cells has been selected after the second execution of the loop, the UE security settings determine how to proceed. In the situation where the UE security settings allow the UE 102 to select unprotected cells, the UE can randomly select a cell with a satisfactory signal, instead of always selecting the cell with the strongest signal. The random selection of a cell can prevent a faked base station from always being selected by keeping on increasing its signal power. If the UE security settings do not allow the UE 102 to connect a priority 3.x cell, or a non-1.x cell for example, the UE 102 can temporarily go out of service.

Mitigation of Replay Attacks

Digitally signed messages are considered tamper-proof, but may be nevertheless replayed. In order to mitigate replay attacks, message timeliness is provided according to the present embodiments, such as by including a time variant parameter along with the message when computing its digital signature, as described above. In addition, some properties of a message originator, if they cannot be easily spoofed, may also be included in the computation of the digital signature to further enhance mitigation against replay attacks.

Two major types of replay attacks discussed herein include (1) local replay attacks (LPA) and (2) remote replay attacks (RPA).

An LPA is an attack in which a false base station receives broadcast information and rebroadcasts the same information. In the LPA, the Time Counter in the replayed messages will be current; however, the LPA will have to use the same PCI as the original cell. Otherwise, the digital signature verification will fail. When two same PCIs are received by UE 102, UE 102 is enabled herein to detect the conflict, obtain a direct time indication from DSnF 604, and use this direct time indication to verify the consistency of received time counters. Depending on how the attack is performed, an LPA may result in the deselection of a legitimate cell, which is generally equivalent to other types of attacks, such as radio jamming or bit flipping of a legitimate cell.

An RPA, on the other hand, is an attack in which a false base station records all broadcasting information including signatures from a remote location, tunnels the messages to another location, and then re-broadcasts. An RPA is also referred to as a "wormhole attack." In this type of attack, the PCI used by the false base station may not result in a conflict.

Wormhole attacks/RPAs require the false base station to have Internet connectivity to receive the broadcasting information from a remote location, thus requiring the false base station to have a UE component to connect to the legitimate cell. In such instances, however, the UE of the attacker may also connect to the false base station itself. To prevent the UE of the attacker from connecting to its own false base station, the attacker usually needs to know in advance the PCI used by the false base station, and then statically configure its UE component to not connect to the PCI used by the false base station. Since the false base station in RPAs does not know which PCI will be successful, it becomes difficult, if not impossible, for the malicious UE component to preconfigure itself. RPAs are thus generally considered impractical to launch.

Nevertheless, even if an RPA is possible, there will be noticeable delay in rebroadcasted messages thereby, due to the transmission and process delay over the tunnel. In other words, the time window during which the RPA may be successful is limited. Accordingly, by having UE 102 check the consistency of time counters among multiple cells, RPAs may also be detected and prevented according to the present embodiments, since the messages from authentic cells will be more recent than replayed messages. In some embodiments, additional information, such as the location information of each cell, may be included and digitally signed in the broadcasting messages to counter the RPA.

Figure 10A:
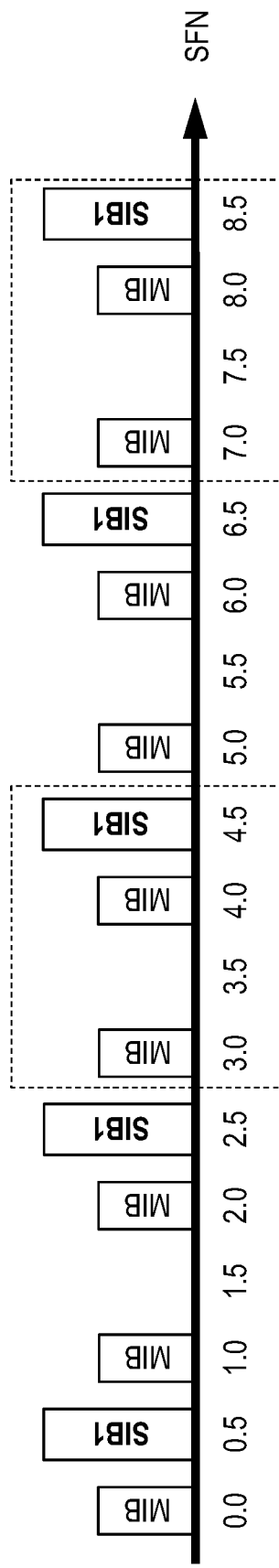
FIGS. 10A-C illustrate various timelines of system information messages to be broadcast from gNBs to UEs based on the system shown in FIG. 1.
Figure 10B:
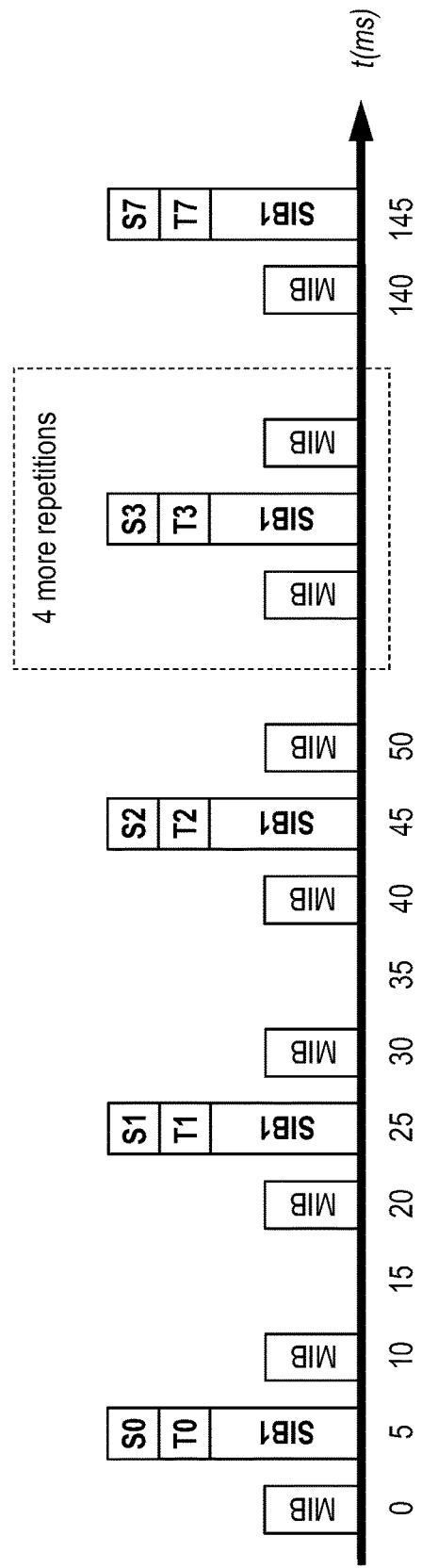
Figure 10C:
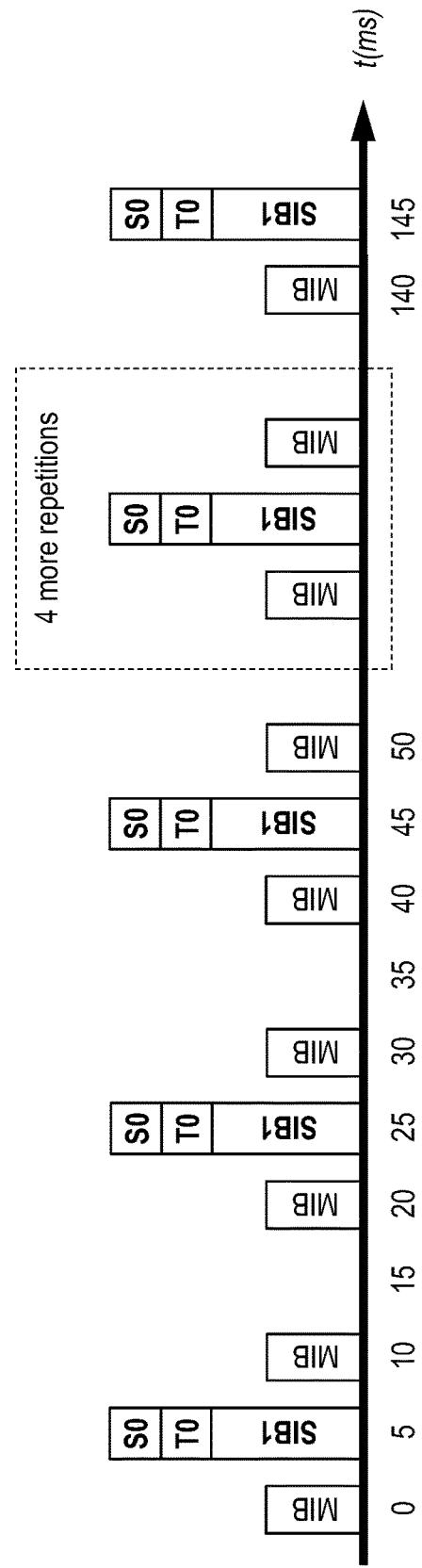

FIGS. 10A-C illustrate various timelines of system information messages to be broadcast from gNBs 104 to UEs 102 based on the system 100 (shown in FIG. 1). Furthermore, FIGS. 10A-10C illustrate examples of MIB and SIB1 scheduling. In the exemplary embodiments, System information (SI) includes MIB and 9 SIBs (SIB1-9). In the exemplary embodiment, each SI is digitally signed. The timeline in FIG. 10A represents the value of SFN. The timeline in FIGS. 10B and 10C is based on time.

The MIB does not have enough space to carry a digital signature; accordingly, one option is to digitally sign MIB and SIB1 together. Note that MIB and SIB1 are broadcasted at subframes 0 and 5 respectively at their scheduled frames. Furthermore, MIB and SIB1 have different periodicities of 80 ms and 160 ms respectively, and MIB and SIB1 are also repeated (e.g., 8 times) within their respective periodicity. In the exemplary embodiment, the SFN field within the MIB contains only the 6 most significant bits of the 10-bit SFN, and therefore changes every 160 ms.

Despite the MIB having a smaller periodicity than SIB1, the MIB remains unchanged within the periodicity of SIB1, i.e., every 160 ms. This allows MIB and SIB1 to be digitally signed together. As shown in FIG. 10A, there are 9 MIBs shown, each of which is broadcasted at SFN=0 (0x0000000000) to 8 (0x0000001000) respectively.

While the 10-bit SFN changes in every MIB repetition, the 6 most significant bits (MSBs) of the SFN contained in the MIB remain 0x000000----) and do not change within 160 ms.

SIB2-5 may be broadcasted at very different periodicity from SIB1 or may be acquired on-demand; therefore, each of SIB2-5 should be signed individually. Since SIB1 and the new SIB_x will be acquired prior to SIB2-5, the gNB 104 delivers the digital signature of SIB2-5 carried within each SIB. Therefore, SIB2-5 are digitally signed individually, and carries its own digital signature.

SIB6-8 originate from an external entity to the core network, such as Cell Broadcast Center Function (CBCF) and the AMF 410 (shown in FIG. 4) and then to the gNBs 104. This allows for two options to protect SIB6-8. The first option is to have the external entity sign the message. This uses a separate solution to provision and manage the trust anchor in UEs 102, as well as a mechanism to communicate to UEs 102 the public key associated with the signing private key. The second option is to have the core networks sign the message. In this option, the message is sent to the DNsF 604 to be signed. The DSnF signs the message (SIB6-8) using a private key associated with the rust key anchor. The private key may be a short-term raw key as discussed herein. Then the message is verified to determine that the DSnF 604 has not changed the message. The signed message is delivered to the gNB 104 for broadcasting, such as via AMF 410.

In exemplary embodiments, at least three types of time variant parameters may be used to provide message timeliness or uniqueness, including without limitation (1) random numbers, (2) sequence numbers, and (3) timestamps.

Random numbers are known to be used in real-time interactive communications, such as a challenge-response authentication protocol, to ensure a response is uniquely computed based on a specific challenge. However, according to the present embodiments, since the SI is not acquired by UE 102 interactively with gNB 104, use of random numbers may not be considered as desirable an option for providing message timeliness in the SI.

A sequence number, on the other hand, is either a serial number or incremental counter value, which may uniquely identify a message. For use of a sequence number to detect replay attack, a recipient needs to receive each and every message from an originator (e.g., gNB 104) and also maintain a state (e.g., the latest sequence number) for the originator. However, such requirements present challenges for system information broadcasting, since UE 102 may not acquire every SIB from every gNB 104 according to the embodiments described herein. Accordingly, use of sequence numbers may also be considered a less desirable option for detecting replayed system information.

Timestamps may also be included with a message to provide the message timeliness to mitigate replay attacks. The timestamp does not require any state to be stored by a recipient, but does require the local clocks of a message originator and a recipient to loosely synchronize. In the present embodiments, since UE 102 is able to synchronizes its local clock with that of gNB 104 prior to acquiring system information, it is reasonable to assume that the clocks between UE 102 and gNB 104 may be considered to be loosely synchronized. Thus, use of a timestamp is may be considered particularly desirable to mitigate replay attacks, based on this assumption according to the present embodiments. As described above with respect to several of the drawings, a timestamp may be included with each SIB, and may also be included in the signature computation, to mitigate replay attacks (e.g., S718, FIG. 7; S818, FIG. 8; S920, FIG. 9).

In an exemplary embodiment, UE 102 checks a timestamp received in a SIB against its local time to determine if the time difference thereof is within an allowed window (t_w). The smaller the t_w is, the more likely a replay may be detected. In a typical scenario where a message is sent out after a local time is obtained and the digital signature is then computed, the total network delay for the message to reach a receiver includes: (i) the computational delay, which is the time taken to compute the digital signature; (ii) the transmission delay at the sender, which is the time taken to transmit the message out from the sender's memory to the network; (iii) the propagation delay, which is the time taken to transmit the message from the sender to the receiver over the network (e.g., over the air); and (iv) the transmission delay at the receiver, which is the time taken to transmit the message from the network to the receiver's memory.

In this example, the total network delay (t_d) is likely less than 1 ms. Thus, the allowed delay window (t_w) may be set to a value slightly higher than the network delay (t_d+τ) to accommodate time deviation between the sender and the receiver. For example, τ=2 ms, which would be the required accuracy of time synchronization. In this example then, t_w=t d+τ=1 ms+2 ms=3 ms.

In practical implementations, the MIB and the SIBs are broadcasted according to precise scheduling. For example, a MIB may be broadcasted every 80 ms and repeated every 10 ms (at the starting of a frame), whereas the SIB1 may be broadcasted at a periodicity of 160 ms and also repeated within the periodicity (e.g., every 20 ms at the starting of a half frame). In the exemplary embodiment, there are several options for assigning timestamps (thus a new digital signature) to SIB1.

In a first option shown in FIG. 10B, each SIB1 repetition is assigned a new timestamp (e.g, timestamp T0 with signature S0, timestamp T1 with signature S1). Thus, in this example, a new digital signature is also computed for each SIB1 repetition in every 20 ms. In this case, there is no scheduled delay to be accommodated. Thus, t_w=t_d+τ=1 ms+2 ms=3 ms.

In a second option shown in FIG. 10C, all SIB1 repetitions within a periodicity share a common timestamp, as well as a common digital signature. Thus, a new timestamp is obtained, and a new digital signature is computed at the beginning of each SIB1 periodicity of 160 ms. In this case, the allowed delay includes the maximum scheduled delay (t_s), i.e., the delay of the last SIB1 repetition within the periodicity, which is 140 ms. Therefore, t_w=t_s+t_d+τ=140 ms+1 ms+1 ms=143 ms.

In a third option, it is also possible to have multiple SIB1 repetitions within a periodicity, or across multiple periodicities that share a common timestamp. Assuming, for example, a timestamp is shared by N≥1 SIB1 repetitions, then the maximum scheduled delay t_s=(N−1)*20 ms, in this example. Accordingly, t_w=t_s+t_d+τ(N−1)*20 ms+3 ms. The value of N has two aspects in an exemplary embodiment.

In one aspect, the smaller the value of N is, the more effective it will be against replay attacks. For example, if N=1 and t_w is set to 3 ms, it would make it very difficult, if not impossible, for a false base station to successfully replay an SIB1. Since a replayed SIB1 has to be processed by the UE component of the false base station and then broadcasted based on scheduling, the replay attack could add more than 3 ms of delay, and therefore more easily detected. However, if N is greater than 1, e.g., N=8 and t_w=143 ms, there may be enough time for an attacker to replay an SIB1 without being detected.

In another aspect, the smaller the value of N is, the higher the computational cost that will be incurred. For example, if N=1, a digital signature may need to be computed every 20 ms. Based on the OpenSSL speed test of ECDSA-256, it takes approximately 24 µs to compute a digital signature. Although this computational overhead appears small, it is not negligible, particularly in the case where one gNB-CU needs to compute digital signatures for multiple gNB-DUs in a distributed gNB architecture. Therefore, the present systems and methods enable calculation of the value of N to strike a balance between security (e.g., lower N value) and performance (e.g., higher N value). Accordingly, in the exemplary embodiment, the number of SIB1 repetitions that share a timestamp and digital signature is configurable and enabled for dynamic adjustment by network operators.

Furthermore, in some embodiments, in some embodiments, the system 100 uses the shared timestamp and digital signature for blocks of time shown in FIG. 10C. If the system 100 detects the possibility of a man in the middle (MIM) attack occurring, the system 100 then switches to where each SIB1 repetition is assigned a new timestamp (shown in FIG. 10B) to address the potential (MIM) attack. The system 100 switches back after a predefined period of time.

Since timestamp alone may not fully mitigate replay attacks in the case where the allowed delay window is large, additional parameters may be used to augment the timestamp to improve replay mitigation. For example, if a sender has some properties that cannot be easily forged by an attacker, or which may be detected if forged, such properties may be included along with a timestamp to improve mitigation against replay attacks. In at least one embodiment, a consistency check of gNB times is performed when the time of the UE is determined to be out of sync with the network.

In this exemplary embodiment, the PCI and downlink frequency may be included in the computation of digital signature of the SI. For example, to replay a digitally signed MIB/SIB1, an attacker would have to use the same PCI and downlink frequency as a legitimate gNB 104. Although both the PCI and the downlink frequency may be forged, a forged PCI may still allow a UE 102 to detect the presence of an attacker when two cells use the same PCI. Additionally, when an attacker is forced to use the same downlink frequency as a legitimate cell, additional signal interference may be introduced thereby, which will also indicate the potential presence of the attacker. Thus, this innovative usage of both the PCI and the downlink frequency may further improve mitigation against replay attacks. According to the embodiments herein, both of the PCI and the downlink frequency may also be digitally signed along with timestamp and MIB/SIB1 to further this mitigation of replay attacks (e.g., FIGS. 7-9, above).

By using a timestamp to mitigate replay attacks, the UE time and the gNB time are deemed loosely synchronized, e.g., to an accuracy of 2 ms, due to the UE 102 and gNB 104 needing to synchronize their clocks in the physical layer to the accuracy of 1 ms or less. In conformance with IEEE 1588, time synchronization accuracy may further be within 10-100 ns.

However, in some instances, the UE time may not be synchronized with the gNB time. Examples of such instances include, but are not limited to, (i) the first time UE 102 is powered on and has never synchronized with a network before (ii) UE 102 has been powered off for too long so that its time is out of sync with the network, and (iii) the UE time may be manipulated (e.g., by an attacker using other methods).

In such exemplary out of sync scenarios, UE 102 may reject the timestamp from a legitimate gNB 104, resulting in a DoS of UE 102. However, this result may be mitigated by checking the consistency of timestamps from multiple cells, assuming that the relevant gNB clocks are synchronized, as described above.

In one example, UE 102 is located within the coverage area of two cells, both of which assign a new timestamp for each SIB1 repetition. In this example, the allowed delay window (t_w) is set to 3 ms, but the UE time deviates from the gNB time by one hour (3,600,000 ms). When UE 102 acquires an SIB1 repetition from the first cell, the SIB1 timestamp is t1 and the UE time is u1. Ignoring, for the purposes of this example, the network delay, the difference between u1 and t1 is approximately 3,600,000 ms, or |u1−t1|=3,600,000 ms. Since this difference is significantly larger than t_w=3 ms, UE 102 will not accept the SIB1 in this example.

Further to this example, when UE 102 acquires another SIB1 repetition from the second cell, the SIB1 timestamp is t2 and the UE time is u2. Again, without considering the network delay, |u2−t2|=3,600,000 ms, which is again significantly larger than t_w=3 ms. Thus, the UE 102 will not accept the SIB1 from the second cell either. Thus, the time deviation from the network may result in a DoS to the UE 102. However, according to the present embodiments, by checking the consistency of |u1−t1| and |u2−t2|, UE 102 may advantageously determine that its own UE time has gone out of sync with the network, and may proceed to select one of the two cells in this example, since the two cell times are consistent with each other. In at least one embodiment, in the case where the two cells may assign a new timestamp to SIB1 repetitions at different rates, UE 102 may be further configured to consider the scheduling delay, such as by leveraging the redundancy version in each SIB1 repetition.

According to the innovative systems and methods herein the present digital signature techniques provide both authenticity and message integrity of system information, advantageously preventing an attacker from originating any MIB/SIBs, or tampering with an existing MIB/SIB. However, as described above, use of a timestamp alone may not always prevent a replay attack, e.g., in the case where the allowed delay window is set to a value that is long enough for a replay to succeed. Additionally, use of a PCI alone may not always enable the UE to detect a replay if the UE is out of the range of a legitimate gNB whose system information is being replayed. These particular challenges are resolved according to the following examples.

In one example, R1 is designated as the broadcasting area of a real base station (RBS1), and F is designated as the broadcasting area of a false base station (FBS). If the FBS replays the system information from RBS1 and uses the same PCI as the RBS1, a particular UE 102 located within the intersection of R1 and F (denoted by F∩R1, in this example) will be able to detect the duplicated PCI from two base stations. However, when UE 102 is located within F but outside of R1, (i.e., F-F∩R1), UE 102 will not be able to detect the duplicated PCI. Although the area where UEs 102 may be attacked by an FBS is reduced by digitally signing PCI, an FBS may choose to replay the system information from another RBS to expand its attacking area. For example, the FBS may replay the system information from RBS2 to attack UEs 102 located within the area of F∩R1.

The digital signature techniques described herein though, provide several hurdles to mitigate and/or prevent the FBS attacker from succeeding. First, to replay system information in real-time (or relay system information), the FBS needs to include its own false gNB as the FBS (FBS-gNB) and its own UE component (FBS-UE). By using the same PCI and downlink frequency, the attacker must find a strategy to prevent the FBS-UE from connecting to the FBS-gNB. Second, even if the FBS manages to successfully relay system information from a legitimate gNB 104, it would be difficult to successfully lure UE 102 away from its camped cell at gNB 104. The FBS would need to use a tracking area code (TAC) that is different from a UE's current TAC to trick UE 102 into believing that it has entered a new tracking area to reselect the FBS-gNB. Since TAC in SIB1 is integrity protected, the FBS will be unable to modify the TAC, thereby preventing replayed system information from having a significant impact on UEs 102 currently camped on nearby cell gNB 104.

Third, replayed system information may be detected by UEs 102 which may receive both the original system information and the replayed system information. In other words, according to the present embodiments, the FBS cannot go undetected. Fourth, when replayed system information is detected based on a duplicated PCI, UE 102 may report the detection to the network and, if necessary, the network may adjust its configuration on the SIB1 timestamp to reduce the allowed delay window such that other UEs 102 are enabled to detect the replayed SIB1 based on the timestamp alone.

Mitigation of Denial-of-Service Attacks

DoS attacks take a multitude of forms including, but not limited to: (1) manipulation of chosen fields in MIB/SIBs; (2) arbitrary bit flipping of signed MIB/SIBs; (3) replay of signed MIB/SIBs; (4) broadcasting of MIB/SIBs with invalid signatures; and (5) manipulation of timing information in UEs or gNBs. Since MIB/SIBs are digitally signed, DoS attacks based on (1) manipulation of chosen fields in MIB/SIBs (e.g., barred cell) may be readily detected and prevented according to the innovative systems and methods described herein. Similarly, DoS attacks based on (2) arbitrarily overwriting a bit in a signed MIB/SIB will result in the failure of digital signature verification herein. If broadcasted MIB/SIBs from all cells in a location are all tampered with, and the MIB/SIBs stored in UE 102 have all expired, UE 102 may go out of service, similar to the response to such known attacks as tampering with synchronization signals or physical jamming.

Where the DoS attack is based on (3) replaying of signed MIB/SIBs, the signed MIB/SIB replay may cause conflict in PCIs that may in turn result in the de-selection of a cell. If there is only one cell in a location, UE 102 may again be taken out of service. The risk from this type of attack is similar to (2) the bit-flipping attacks.

Where the DoS attack is based on (4) an attacker broadcasting MIB/SIBs with invalid signatures, UE 102 is enabled herein to detect the invalid signature(s) and attempt to select another cell. However, this type of attacker may then change its frequency and PCI and then again broadcast MIB/SIBs with invalid signatures. In such instances, UE 102 may "think" it is selecting a different cell, but may actually be attempting to unknowingly select the same attacking cell having a changed frequency and PCI. This type of attack will be more successful in the case of UE 102 attempting a cell scanning after each failed cell. According to the present embodiments though, this type of attack is mitigated by enabling UE 102 to attempt selection only with each of the cells from a list obtained from a single scan.

Where the DoS attack is based on (5) manipulation of the UE time, such as to a time in the future, the time counters in all broadcasting messages may fail the validation step. This type of attack is mitigated according to the present embodiments by enabling UE 102 to select a cell having the most recent time counter for continuing service. Thus, even if the time of gNB 104 has been manipulated, no additional security issues will arise from the present technique, since the time counters in the broadcasting messages are generated by DSnF 604, whose time may be trusted.

Mitigation of Downgrading Attacks

It is expected that message servers or gNBs utilizing the present digital signature protection techniques will be deployed over time, and that there will be areas where cells supporting this digital signature protection will co-exist with cells not supporting such security features. It is foreseen that some attacker may attempt to exploit this co-existence by intercepting digitally signed system information from supported cells, tamper with the intercepted information (e.g., by removing all digital signature related information), and then rebroadcasting the tampered information, similar to the case of an FBS broadcasting its own faked system information, described above. As long as the protected system information though, may be received by a supported UE, the UE may set the protected system information as a preference over unprotected information.

A protected gNB 104, however, may become overloaded if there are too many UEs 102 in the area of that gNB that prefer and select the protected cell thereof. In such cases, conventional radio resource management procedures may be invoked by gNB 104 to limit the number of UEs 102 served thereby (e.g., using cellBarred=1). Accordingly, some such UEs 102 may have to connect to legacy cells to stay in service if all protected gNBs 104 are overloaded. If there is an FBS within this legacy cell area, the FBS may be able to attract the detoured UEs 102 to connect. However, the FBS will not be likely able to predict when such congestion would occur. Nevertheless, some FBS attackers may attempt to proactively cause congestion in the area of protected gNBs 104, to force UEs 102 away from those protected gNBs, and then lure the forced UEs 102 to connect to the FBS. However, such proactive attack attempts would more readily expose the FBS, and thus the overall security risk from such downgrading attacks is considered relatively low during this co-existence phase, and practically non-existent upon full deployment.

In the case where a downgrading attacker may attempt to cause the digital signatures from all cells to fail verification, UE 102 may be configured to go temporarily out of service, similar to the response to some of the DoS attack types, described above.

The computer-implemented methods and processes described herein may include additional, fewer, or alternate actions, including those discussed elsewhere herein. The present systems and methods may be implemented using one or more local or remote processors, transceivers, and/or sensors (such as processors, transceivers, and/or sensors mounted on vehicles, stations, nodes, or mobile devices, or associated with smart infrastructures and/or remote servers), and/or through implementation of computer-executable instructions stored on non-transitory computer-readable media or medium. Unless described herein to the contrary, the various steps of the several processes may be performed in a different order, or simultaneously in some instances.

Additionally, the computer systems discussed herein may include additional, fewer, or alternative elements and respective functionalities, including those discussed elsewhere herein, which themselves may include or be implemented according to computer-executable instructions stored on non-transitory computer-readable media or medium.

In the exemplary embodiment, a processing element may be instructed to execute one or more of the processes and subprocesses described above by providing the processing element with computer-executable instructions to perform such steps/substeps, and store collected data (e.g., time variant parameters, digital signatures, certificates, etc.) in a memory or storage associated therewith. This stored information may be used by the respective processing elements to make the determinations necessary to perform other relevant processing steps, as described above.

The aspects described herein may be implemented as part of one or more computer components, such as a client device, system, and/or components thereof, for example. Furthermore, one or more of the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

Furthermore, the embodiments described herein improve upon existing technologies, and improve the functionality of computers, by more reliably protecting the integrity of broadcast messages and timestamps at the server-side, and by further enabling the easier and more efficient verification of a received broadcast message at the client-side. The present embodiments therefore improve the speed, efficiency, and reliability in which such determinations and processor analyses may be performed. Due to these improvements, the aspects described herein address computer-related issues that significantly improve the security of broadcasting messages in comparison with conventional techniques. Thus, the aspects herein may be seen to also address computer-related issues such as communication security between electronic computing devices or systems, for example.

Exemplary embodiments of systems and methods for broadcast messaging protection are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A client-side electronic device for receiving broadcast messages from a communication network, comprising:
    a receiver configured for operable communication with a plurality of message servers over a communication medium of the communication network, wherein each message server is associated with a cell of a plurality of cells, and wherein a first message server of the plurality of message servers is associated a first cell of the plurality of cells; and
    a processor including a memory configured to store computer-executable instructions, which, when executed by the processor, cause the device to:
        receive a broadcast message from the first message server of the plurality of message servers, wherein the broadcast message includes a digital signature and a timestamp;
        determine if the digital signature is valid;
        determine if the timestamp is fresh;
        assign a priority to the first cell based upon the determine if the digital signature is valid and if the timestamp is fresh; and
        determine whether or not to connect to the first cell via the first message server based on the assigned priority.

2. The device of claim 1, wherein the broadcast message further includes a physical cell identifier (PCI), and wherein the instructions further cause the device to:
    determine if the PCI is unique; and
    determine whether or not to connect to the first cell via the first message server based on whether the digital signature is valid, the PCI is unique, and the timestamp is fresh.

3. The device of claim 1, wherein the instructions further cause the device to:
    determine if a public key associated with the digital signature is valid; and
    determine whether or not to connect to the first cell via the first message server based on whether the digital signature is valid, the public key is trusted, and the timestamp is fresh.

4. The device of claim 1, wherein the instructions further cause the device to:
    store a security policy; and
    determine whether or not to connect to the first cell via the first message server based on whether the digital signature is valid, whether the timestamp is fresh, and further based on the stored security policy.

5. The device of claim 1, wherein to determine if the timestamp is fresh, the instructions further cause the device to compare the timestamp in the broadcast message to a second timestamp received in a second broadcast message from a second message server.

6. The device of claim 1, wherein the instructions further cause the device to:
    detect a discrepancy between the timestamp of the broadcast message and a current time of the device;
    receive a second broadcast message from a second message server including a second timestamp;
    compare the timestamp to the second timestamp; and
    determine that the timestamp is fresh if the timestamp is consistent with the second timestamp.

7. The device of claim 1, wherein the instructions further cause the device to connect to the first message server of the plurality of message servers only if the corresponding broadcast message is fully validated.

8. The device of claim 1, wherein the broadcast message is a first broadcast message, and wherein the instructions further cause the device to connect to the first message server of the plurality of message servers even if the first broadcast message failed validations without validating a second broadcast message.

9. The device of claim 1, wherein the broadcast message is a first broadcast message, and wherein the instructions further cause the device to connect to the first message server of the plurality of message servers even if the digital signature is missing from the first broadcast message and without validating a second broadcast message.

10. The device of claim 1, wherein the broadcast message is a first broadcast message, and wherein the instructions further cause the device to:
    access a previously received, stored, and validated broadcast message from the first server; and
    determine whether or not to connect to the first message server based on previously received, stored, and validated broadcast message from the first server.

11. A method for authenticating broadcast messages performed by a client-side electronic device for receiving broadcast messages from a communication network, comprising:
    a receiver configured for operable communication with a plurality of message servers over a communication medium of the communication network, wherein each message server is associated with a cell of a plurality of cells, and wherein a first message server of the plurality of message servers is associated a first cell of the plurality of cells; and a processor including a memory configured to store computer-executable instructions, wherein the method comprises:

receiving a broadcast message from the first message server of the plurality of message servers, wherein the broadcast message includes a digital signature and a timestamp;

determining if the digital signature is valid;

determining if the timestamp is fresh;

assigning a priority to the first cell based upon whether the determination if the digital signature is valid and if the timestamp is fresh; and determining whether or not to connect to the first cell via the first message server based on the assigned priority.

12. The method of claim 11, wherein the broadcast message further includes a physical cell identifier (PCI), and wherein the method further comprises:

determining if the PCI is unique; and determining whether or not to connect to the first cell via the first message server based on whether the digital signature is valid, the PCI is unique, and the timestamp is fresh.

13. The method of claim 11 further comprising:

determining if a public key associated with the digital signature is valid; and determining whether or not to connect to the first cell via the first message server based on whether the digital signature is valid, the public key is trusted, and the timestamp is fresh.

14. The method of claim 11 further comprising:

storing a security policy; and determining whether or not to connect to the first cell via the first message server based on whether the digital signature is valid, whether the timestamp is fresh, and further based on the stored security policy.

15. The method of claim 11, wherein to determine if the timestamp is fresh, the method further comprises comparing the timestamp in the broadcast message to a second timestamp received in a second broadcast message from a second message server.

16. The method of claim 11 further comprising:

detecting a discrepancy between the timestamp of the broadcast message and a current time of the device;

receiving a second broadcast message from a second message server including a second timestamp;

comparing the timestamp to the second timestamp; and determining that the timestamp is fresh if the timestamp is consistent with the second timestamp.

17. The method of claim 11, wherein the broadcast message is a first broadcast message, and wherein the further comprises connecting to the first message server of the plurality of message servers even if the first broadcast message failed validations without validating a second broadcast message.

18. The method of claim 11, wherein the broadcast message is a first broadcast message, and wherein the further comprises connecting to the first message server of the plurality of message servers even if the digital signature is missing from the first broadcast message and without validating a second broadcast message.

19. The method of claim 11, wherein the broadcast message is a first broadcast message, and wherein the method further comprises:

accessing a previously received, stored, and validated broadcast message from the first cell; and determining whether or not to connect to the first cell via the first message server based on previously received, stored, and validated broadcast message from the first message server.

20. The device of claim 1, wherein the instruction further cause the device to:

receive a plurality of messages from a plurality of message servers associated with a plurality of cells;

for each message of the plurality of messages, determine if the digital signature is valid and if the timestamp is fresh;

assign a priority to each cell of the plurality of cells based upon whether the determination if the digital signature is valid and if the timestamp is fresh; and select a cell to connect to of the plurality of cells based upon the corresponding priorities.

* * * * *